United States Patent
Terashima

(10) Patent No.: US 8,531,541 B2
(45) Date of Patent: Sep. 10, 2013

(54) DISPLAY CONTROL APPARATUS, IMAGE CAPTURING APPARATUS, DISPLAY CONTROL METHOD, AND PROGRAM

(75) Inventor: Yoshito Terashima, Tokyo (JP)

(73) Assignee: Sony Corporation (JP)

( * ) Notice: Subject to any disclaimer, the term of this patent is extended or adjusted under 35 U.S.C. 154(b) by 282 days.

(21) Appl. No.: 12/733,581

(22) PCT Filed: Aug. 7, 2008

(86) PCT No.: PCT/JP2008/064194
§ 371 (c)(1),
(2), (4) Date: Mar. 9, 2010

(87) PCT Pub. No.: WO2009/037925
PCT Pub. Date: Mar. 26, 2009

(65) Prior Publication Data
US 2010/0194963 A1    Aug. 5, 2010

(30) Foreign Application Priority Data

Sep. 18, 2007  (JP) ................................ 2007-241468

(51) Int. Cl.
*H04N 2/228* (2006.01)
*H04N 5/76* (2006.01)
*H04N 5/222* (2006.01)

(52) U.S. Cl.
USPC ................. 348/222.1; 348/231.2; 348/333.01

(58) Field of Classification Search
USPC .............. 348/231.2, 333.01, 333.02, 333.05, 348/333.12
See application file for complete search history.

(56) References Cited

U.S. PATENT DOCUMENTS

| 7,787,041 | B2 * | 8/2010 | Kaku ....................... 348/333.02 |
| 8,018,493 | B2 * | 9/2011 | Sakaue et al. .............. 348/207.2 |
| 8,044,945 | B2 * | 10/2011 | Takamori et al. ............ 345/204 |
| 8,089,521 | B2 * | 1/2012 | Suzuki et al. .............. 348/220.1 |
| 2002/0008769 | A1 * | 1/2002 | Sato ........................ 348/333.05 |
| 2002/0018138 | A1 * | 2/2002 | Yoshiro .................... 348/333.05 |

(Continued)

FOREIGN PATENT DOCUMENTS

| JP | 11004380 A | 1/1999 |
| JP | 2001-285779 A | 10/2001 |

(Continued)

OTHER PUBLICATIONS

Office Action from Japanese Application No. 2008-189945, dated May 8, 2012.

*Primary Examiner* — Sinh Tran
*Assistant Examiner* — Salem Gebriel
(74) *Attorney, Agent, or Firm* — Lerner, David, Littenberg, Krumholz & Mentlik, LLP

(57) ABSTRACT

A user-preferred image is easily displayed for a plurality of images generated by bracketing capture. A recording control unit adds the same group identifier to a plurality of captured images generated by the same bracketing-capture operation, allocates the plurality of captured images to the same folder, and records the plurality of captured images on a recording unit as bracketing-captured images. A priority image setting unit adds priority information to a bracketing-captured image selected by a user among the bracketing-captured images recorded on the recording unit, and sets a priority image. In addition, the priority image setting unit allocates the priority image to a main folder, and allocates bracketing-captured images other than the priority image to a sub-folder. In a predetermined display mode, a display control unit displays only the priority image among the bracketing-captured images on the display unit on the basis of the priority information.

9 Claims, 18 Drawing Sheets

(56) References Cited

U.S. PATENT DOCUMENTS

| | | | |
|---|---|---|---|
| 2003/0002715 A1* | 1/2003 | Kowald | 382/118 |
| 2003/0090690 A1* | 5/2003 | Katayama et al. | 358/1.9 |
| 2004/0218080 A1 | 11/2004 | Stavely et al. | |
| 2004/0258304 A1* | 12/2004 | Shiota et al. | 382/170 |
| 2005/0120307 A1 | 6/2005 | Suzuki | |
| 2006/0023076 A1* | 2/2006 | Jeoung | 348/220.1 |
| 2006/0098111 A1* | 5/2006 | Goh et al. | 348/333.05 |
| 2006/0221223 A1* | 10/2006 | Terada | 348/333.05 |
| 2009/0207279 A1 | 8/2009 | Ochi et al. | |
| 2011/0128414 A1* | 6/2011 | Walker et al. | 348/231.99 |

FOREIGN PATENT DOCUMENTS

| | | |
|---|---|---|
| JP | 2002051250 A | 2/2002 |
| JP | 2002-152579 A | 5/2002 |
| JP | 2002232751 A | 8/2002 |
| JP | 2004-133637 A | 4/2004 |
| JP | 2004-135029 A | 4/2004 |
| JP | 2004-229073 A | 8/2004 |
| JP | 2004-336790 A | 11/2004 |
| JP | 2005-167469 A | 6/2005 |
| JP | 2006-295244 A | 10/2006 |
| WO | WO-2008-087914 A1 | 7/2008 |

* cited by examiner

FIG. 2
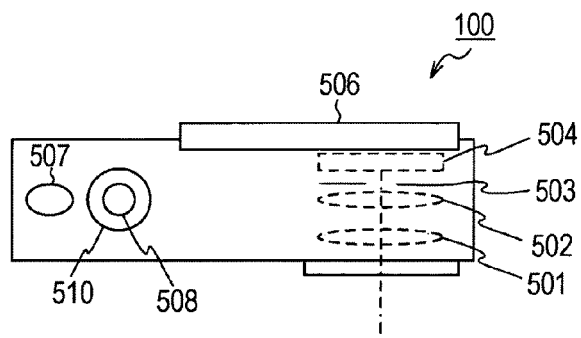
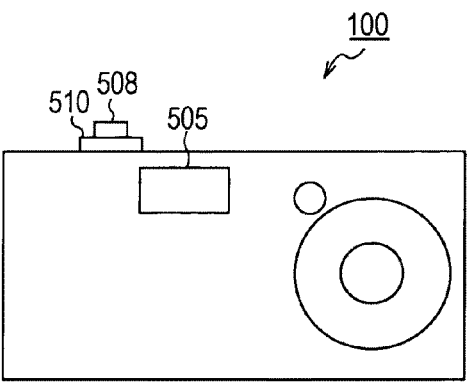
(b)
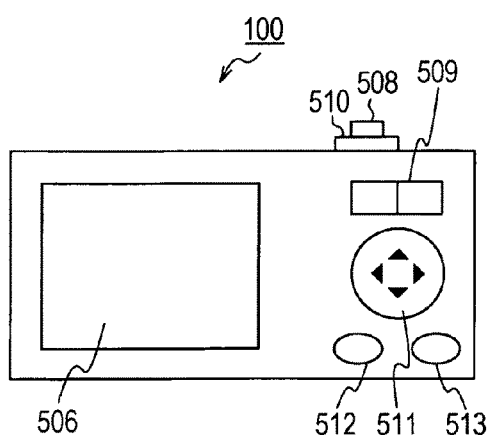
(c)

FIG. 5
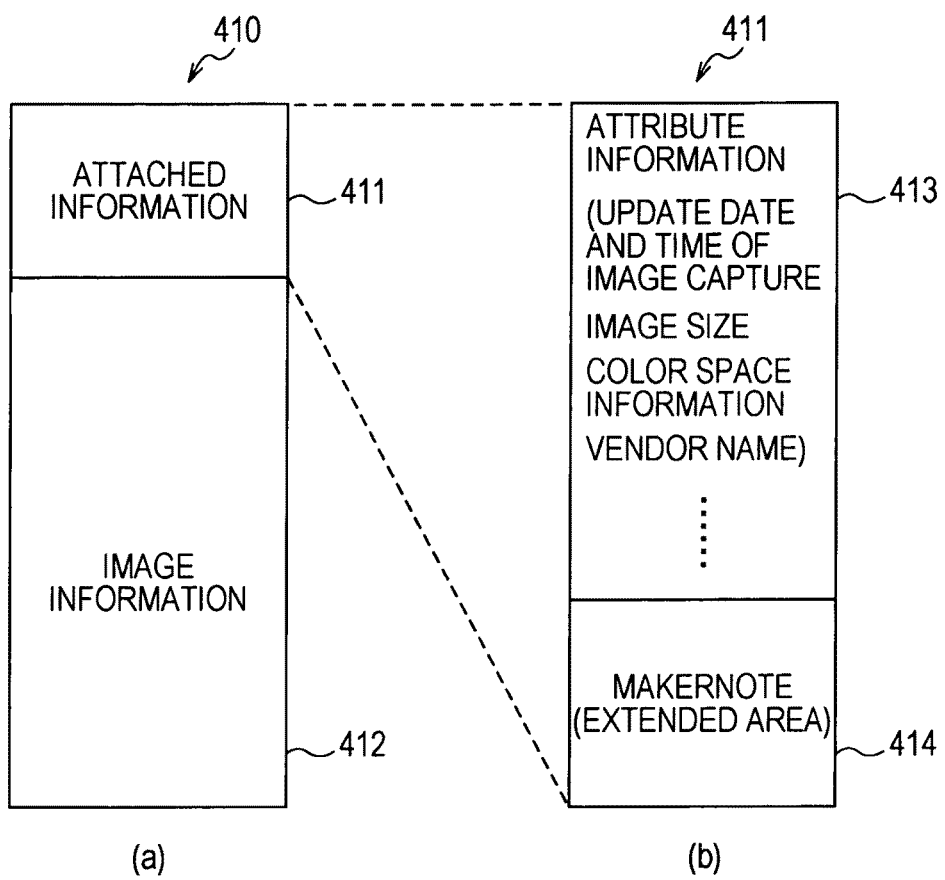
(a)     (b)
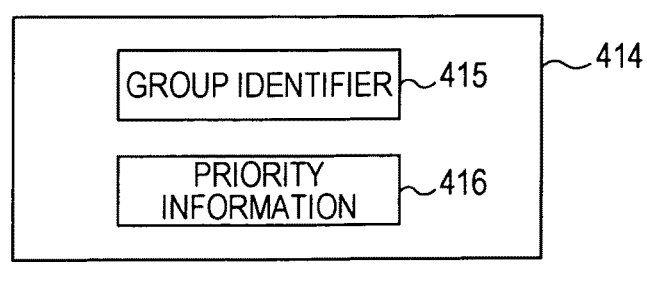
(c)

FIG. 19
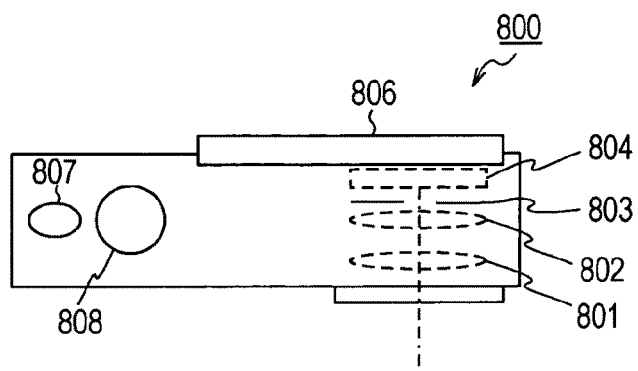
(a)
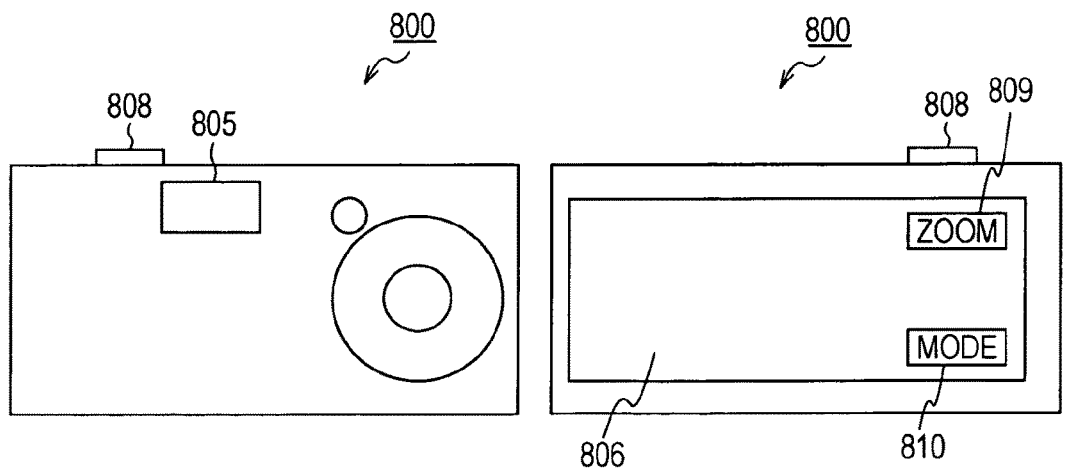
(b)          (c)

DISPLAY CONTROL APPARATUS, IMAGE CAPTURING APPARATUS, DISPLAY CONTROL METHOD, AND PROGRAM

CROSS-REFERENCES TO RELATED APPLICATIONS

The present application is a national phase entry under 35 U.S.C. §371 of International Application No. PCT/JP2008/064194 filed Aug. 7, 2008, published on Mar. 26, 2009 as WO 2009/037925 A1, which claims priority from Japanese Patent Application No. JP 2007-241468 filed in the Japanese Patent Office on Sep. 18, 2007.

TECHNICAL FIELD

The present invention relates to a display control apparatus, more specifically to a display control apparatus that controls the display state of an image generated by bracketing capture, an image capturing apparatus that performs bracketing capture, a processing method used in these apparatuses, and a program for causing a computer to execute this method.

BACKGROUND ART

In recent years, image capturing apparatuses that record captured images obtained by capturing images of subjects such as persons, such as digital still cameras and camcorders, have been widely used. In addition, with improved image recognition technology, image capturing apparatuses that control image capturing conditions on the basis of recognition results obtained by image recognition to perform image capture have been realized. This can reduce failure caused by recording a captured image.

However, because of diverse preferences of users, a captured image captured with the use of the image recognition technology described above may not necessarily be a user-preferred image.

Accordingly, for example, an image capturing apparatus that displays a list of images captured in accordance with a plurality of image capturing conditions having different exposure conditions to allow a user to select a desired image from among the images displayed in the list and that records the selected image is disclosed (see, for example, Japanese Unexamined Patent Application Publication No. 2002-152579 (FIG. 5)). In addition, for example, a digital still camera that displays a plurality of alternative images having different exposure settings and that records an image selected by a user from among the alternative images is disclosed (see, for example, Japanese Unexamined Patent Application Publication No. 2004-336790 (FIG. 2)).

Since the technology described above allows a user to select a desired image from among a plurality of images being displayed before recording an image during the image capture operation, a user-preferred image selected by the user can be recorded. However, for example, it is supposed that it is difficult for a less experienced user to select an appropriate image from among a plurality of images being displayed for a short period of time during the image capture operation. In this case, there is a risk that a user-preferred captured image cannot be recorded. In addition, in a case where a user selects a wrong image, an image desired by the user cannot be recorded.

Accordingly, bracketing capture is conceived as a method for recording a user-preferred captured image. This bracketing capture is a technique for capturing a plurality of successive images while changing an image capturing condition such as the exposure value. For example, a digital still camera that sets a plurality of exposure values, that performs bracketing capture in accordance with these exposure values, and that displays an image captured in accordance with a reference exposure value as a representative image is disclosed (see, for example, Japanese Unexamined Patent Application Publication No. 2001-285779 (FIG. 7)).

In the related art described above, a plurality of images generated by bracketing capture are recorded on a recording medium. In addition, in a case where the individual images recorded on the recording medium are displayed in a list, a representative image is displayed for images recorded by bracketing capture. This can prevent a plurality of images including the same subject, which has been recorded by bracketing capture, from being displayed so as to overlap each other when individual images recorded on the recording medium are displayed in a list. In addition, by selecting a representative image being displayed in a list display screen, individual images included in an image group to which the selected representative image belongs can be displayed. Thus, a desired image can be viewed from among the plurality of images recorded by bracketing capture.

However, it is also conceived that a representative image displayed in a case where individual images recorded on the recording medium are displayed in a list is not a user-preferred image. In this manner, in a case where a representative image is not a user-preferred image, in order to view a desired image from among a plurality of images generated by bracketing capture, it is necessary to select a representative image being displayed in the list and to display individual images included in an image group corresponding to this representative image. Therefore, for example, in a case where user-preferred images are to be sequentially displayed for individual image groups in a case where a large number of images generated by bracketing capture have been recorded, this display operation may be bothersome.

The present invention has been made in view of such a situation, and it is an object thereof to facilitate easy display of a user-preferred image for a plurality of images generated by bracketing capture.

DISCLOSURE OF INVENTION

The present invention has been made in order to solve the foregoing problem, and a first aspect thereof provides a display control apparatus including a priority image setting unit that sets at least one image, as a priority image, on the basis of a user selection, among a bracketed image group composed of a plurality of images generated by a single bracketing-capture operation, and a display control unit that controls a display state of a display unit so that only the priority image among the bracketed image group is displayed on the display unit in a predetermined mode, a processing method for the display control apparatus, and a program for causing a computer to execute this method. This brings the effect of setting at least one image among a bracketed image group generated by a single bracketing-capture operation as a priority image on the basis of a user selection, and controlling a display state so that only the priority image among the bracketed image group is displayed in a predetermined mode.

In addition, in this first aspect, the priority image setting unit may be configured to add priority information to the priority image, and the display control unit may be configured to control the display state on the basis of the priority information. This brings the effect of adding priority information to a priority image and controlling a display state on the basis of the priority information.

In addition, in this first aspect, the display control apparatus may be configured to further include a group identifier adding unit that adds a same group identifier to each of the images included in the bracketed image group generated by a same bracketing-capture operation. This brings the effect of adding the same group identifier to each of images included in a bracketed image group generated by the same bracketing-capture operation. In addition, in this case, the priority image setting unit may be configured to allocate, for the bracketed image group, the priority image to a first folder and to further allocate an image other than the priority image to a second folder different from the first folder. This brings the effect of allocating, for a bracketed image group, a priority image to a first folder and allocating an image other than the priority image to a second folder.

In addition, in this first aspect, the display control apparatus may be configured to further include a folder allocating unit that allocates each of the images included in the bracketed image group generated by a same bracketing-capture operation to a same folder. This brings the effect of allocating each of images included in a bracketed image group generated by the same bracketing-capture operation to the same folder.

In addition, in this first aspect, the display control apparatus may be configured to further include an operation receiving unit that receives a specifying operation for specifying at least one display mode among a plurality of display modes including the predetermined mode, and the display control unit may be configured to control the display state of the display unit so that in a case where a specifying operation for specifying the predetermined mode has been received, only the priority image among the bracketed image group is displayed on the display unit, and to control the display state of the display unit so that in a case where a specifying operation for specifying a display mode other than the predetermined mode has been received, each of the images included in the bracketed image group is displayed on the display unit. This brings the effect of controlling the display state so that in a case where a specifying operation for specifying a predetermined mode has been received, only a priority image among a bracketed image group is displayed, and controlling the display state so that in a case where a specifying operation for specifying a display mode other than the predetermined mode has been received, each of images included in the bracketed image group is displayed.

In addition, a second aspect of the present invention provides an image capturing apparatus including an image generation unit that generates an image by performing a bracketing-capture operation, and a priority image setting unit that sets at least one image, as a priority image, on the basis of a user selection, among a bracketed image group composed of a plurality of images generated by a single bracketing-capture operation, a processing method for the image capturing apparatus, and a program for causing a computer to execute this method. This brings the effect of generating an image by a bracketing-capture operation and setting at least one image among a bracketed image group generated by a single bracketing-capture operation as a priority image on the basis of a user selection.

In addition, in this second aspect, the image capturing apparatus may be configured to further include an operation mode control unit that causes the image generation unit to operate in a first bracketing capture mode that causes the image generation unit to generate, as the bracketing-capture operation, after setting image capture parameters with regard to a same image capturing condition object to different values, one image for each of the set image capture parameters, and in a second bracketing capture mode that causes the image generation unit to generate, as the bracketing-capture operation, after setting a plurality of image capturing conditions so that at least one of respective image capture parameters with regard to image capturing condition objects that are different from each other has values that are different from each other, one image for each of the set image capturing conditions, and the priority image setting unit may be configured to set only the bracketed image group generated in the second bracketing capture mode to be subjected to setting of the priority image. This brings the effect of setting only a bracketed image group generated in the second bracketing capture mode to be subjected to the setting of a priority image.

According to the present invention, the outstanding advantage that a user-preferred image can be easily displayed for a plurality of images generated by bracketing capture is achieved.

BRIEF DESCRIPTION OF DRAWINGS

FIG. 2 is a diagram illustrating an example external configuration of the image capturing apparatus 100 in the embodiment of the present invention.

FIG. 5 is a diagram illustrating an overview of a file structure of a still image file recorded using the DCF standard.

FIG. 19 is an example external configuration diagram illustrating an image capturing apparatus 800 in an embodiment of the present invention.

BEST MODE FOR CARRYING OUT THE INVENTION

Next, embodiments of the present invention will be explained in detail with reference to the drawings.

Figure 1:
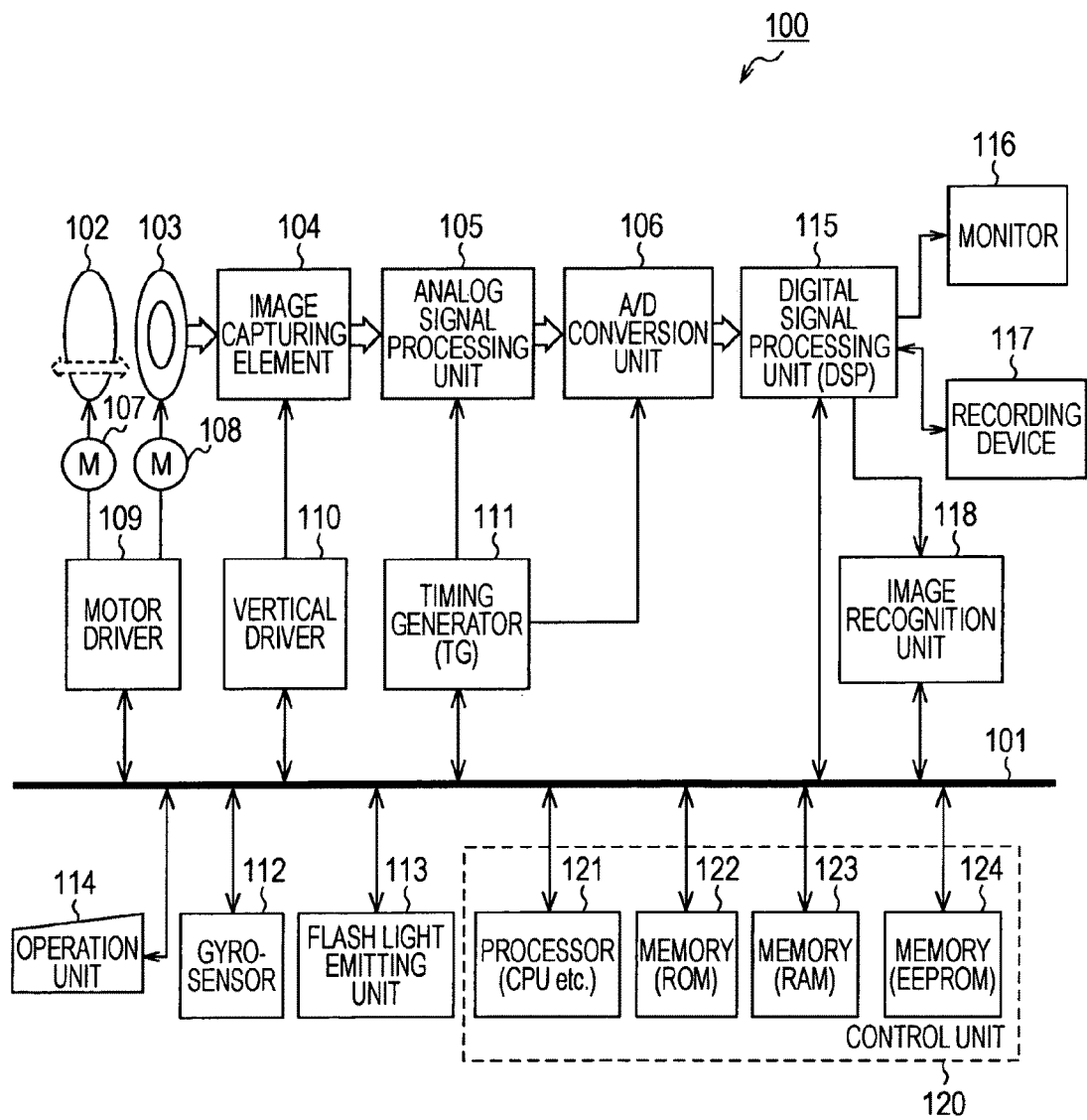
FIG. 1 is a block diagram illustrating an example internal configuration of an image capturing apparatus 100 in an embodiment of the present invention.

FIG. 1 is a block diagram illustrating an example internal configuration of an image capturing apparatus 100 in an embodiment of the present invention. The image capturing apparatus 100 includes a system bus 101, a lens 102, an aperture mechanism 103, an image capturing element 104, an analog signal processing unit 105, and an A/D (Analog/Digital) conversion unit 106. In addition, the image capturing apparatus 100 includes a lens driving motor 107, an aperture driving motor 108, a motor driver 109, a vertical driver 110, a timing generator (hereinafter referred to as a "TG (Timing Generator)") 111, a gyro-sensor 112, and a flash light emitting unit 113. In addition, the image capturing apparatus 100 includes an operation unit 114, a digital signal processing unit (hereinafter referred to as a "DSP (Digital Signal Processor)") 115, a monitor 116, a recording device 117, an image recognition unit 118, and a control unit 120. In addition, the motor driver 109, the vertical driver 110, the TG 111, the gyro-sensor 112, the flash light emitting unit 113, the operation unit 114, the DSP 115, the image recognition unit 118, and the control unit 120 are configured to be connected to the system bus 101. The image capturing apparatus 100 can be implemented by, for example, a digital still camera or a camcorder having a bracketing capture function.

The lens 102 is designed to take in incident light from the subject and to supply the incident light to the aperture mechanism 103. The lens 102 is driven by the lens driving motor 107 to move back and forth with respect to the subject. Thereby, focusing or zooming is performed. The aperture mechanism 103 is designed to adjust the amount of incident light that has passed through the lens 102 and to supply the incident light to the image capturing element 104. The aperture mechanism 103 is driven by the aperture driving motor 108 to adjust the opening of the aperture.

The image capturing element 104 is a photoelectric conversion element that receives the incident light supplied from the aperture mechanism 103 and that converts the incident light into an electrical signal. The image capturing element 104 is driven by the vertical driver 110. Note that the image capturing element 104 is provided with, on a front surface of each pixel, for example, a color filter that allows one of red color (R) light, green color (G) light, and blue color (B) light to pass therethrough, and receives a pixel signal of each color. In addition, this image capturing element is implemented using CCD (Charge Coupled Devices) or the like. The converted electric signal is supplied to the analog signal processing unit 105.

The analog signal processing unit 105 is designed to be driven by the TG 111 to perform analog processing, such as removing noise, on the electric signal supplied from the image capturing element 104. The signal processed by the analog signal processing unit 105 is supplied to the A/D conversion unit 106.

The A/D conversion unit 106 is designed to be driven by the TG 111 to convert the signal supplied from the analog signal processing unit 105 into a digital signal. The digital signal converted by the A/D conversion unit 106 is supplied to the DSP 115.

The lens driving motor 107 is designed to drive the lens 102 in accordance with an instruction from the motor driver 109. The aperture driving motor 108 is designed to drive the aperture mechanism 103 in accordance with an instruction from the motor driver 109. In accordance with an instruction from the control unit 120, the motor driver 109 drives the lens driving motor 107 and the aperture driving motor 108. The vertical driver 110 drives the image capturing element 104 in accordance with an instruction from the control unit 120. The TG 111 generates a drive control signal for the analog signal processing unit 105 and the A/D conversion unit 106 on the basis of a reference clock transmitted from the control unit 120.

At the time of image capture, the gyro-sensor 112 detects a change corresponding to a positional change (so-called camera shake, etc.) of the image capturing element 104 in the horizontal direction or vertical direction of a captured image, and transmits the detected amount of change to the control unit 120. The flash light emitting unit 113 is designed to radiate a beam of light onto the subject in accordance with an instruction from the control unit 120 to increase the light (reflected light) from the subject. This enables image capture even in a situation where ambient illumination is low.

The operation unit 114 is configured using switches, buttons, and the like for transmitting the content of various operations (various settings for the shutter and camera, a selected image, etc.) of a user to the control unit 120. In addition, the operation unit 114 can also be configured using a touch panel.

The DSP 115 is designed to perform, in accordance with an instruction of the control unit 120, image processing such as black level correction, white balance adjustment, or γ correction on the digital signal supplied from the A/D conversion unit 106. The image data on which image processing has been performed by the DSP 115 is output to the monitor 116, the recording device 117, the image recognition unit 118, or the like. For example, the DSP 115 performs compression processing on the image data on which image processing has been performed, and supplies the image data on which compression processing has been performed (compressed image data) to the recording device 117. In addition, the DSP 115 performs expansion processing on compressed image data recorded on the recording device 117, and supplies the image data on which expansion processing has been performed to the monitor 116. Note that, for example, the JPEG (Joint Photographic Experts Group) scheme can be adopted as the compression scheme.

The monitor 116 is a device that displays image data transmitted from the DSP 115. The monitor 116 displays, for example, image data on which image processing has been performed by the DSP 115 as a through screen. In addition, for example, the monitor 116 displays image data recorded on the recording device 117 as a list of images. The monitor 116 can be implemented by, for example, an LCD (Liquid Crystal Display).

The recording device 117 is a recording device that records image data on which image processing has been performed by the DSP 115. In addition, the recording device 117 supplies image data recorded thereon to the DSP 115. Note that the recording device 117 may be incorporated in the image capturing apparatus 100 or may be removably attached to the image capturing apparatus 100. In addition, various devices such as a semiconductor memory, an optical recording medium, a magnetic disk, and an HDD (Hard Disk Drive) can be used as the recording device 117. Note that an optical recording medium may be implemented using, for example, a recordable DVD (Digital Versatile Disc), a recordable CD (Compact Disc), a Blu-ray Disc (registered trademark), or the like.

The image recognition unit 118 is designed to judge, in accordance with an instruction of the control unit 120, the subject itself included in the image data (captured image) on which image processing has been performed by the DSP 115, the conditions of the subject, the ambient conditions, etc., and outputs judgment information, which indicates those judgment results, to the control unit 120. For example, the image recognition unit 118 extracts a feature value from the image data on which image processing has been performed by the DSP 115, and judges whether or not the subject in the image data corresponds to a specific captured image scene on the basis of the feature value. Then, the judgment results are output to the control unit 120. In addition, the image recognition unit 118 detects a face included in the image data on which image processing has been performed by the DSP 115, and outputs the detection result to the control unit 120.

For example, a method for determining a captured image scene or a subject has various techniques. For example, as a method for determining a backlight scene or a night scene, there exists a method of creating a histogram of luminance levels of a captured image on the entire screen and executing pattern matching of the distribution in the created histogram to thereby determine a backlight scene or a night scene. In addition, with the use of hue information and estimated light source information together with the determination based on the histogram of luminance levels of a captured image on the entire screen, more scenes can be determined.

In addition, a face detection method for detecting a human face included in the subject using face detection technology is widely known. As this face detection, for example, there exists a face detection method for detecting a face by using matching between a template on which face luminance distribution information is recorded and a real image (see, for example, Japanese Unexamined Patent Application Publication No. 2004-133637). With the use of these face detection methods, it can be determined whether or not a human face is included in the subject. In addition, the size and position of the face included in the subject can also be detected.

In addition to these detections, the movement condition of the subject can be estimated from motion vector information about a captured image. In addition, with the use of focal length information or autofocus position information, the distance of the position where the subject exists from the image capturing apparatus 100 can be obtained. These enable further improved accuracy of scene determination.

Since each captured image scene can be determined using the scene judgment method described above, it is possible to refine image capture modes optimum for the subject in the current captured image from a plurality of image capture modes. This allows automatic setting of image capturing conditions used in the case of, for example, performing bracketing capture. In addition, in a case where the face is moving or in a case where it is determined that the face is smiling, a continuous shooting mode can also be set so as not to miss image capture opportunities.

The control unit 120 includes a processor (a CPU, etc.) 121, a memory (ROM) 122, a memory (RAM) 123, and a memory (EEPROM) 124. The memory (ROM (Read Only Memory)) 122 is a memory that stores programs for performing various kinds of software processing in the processor 121. The memory (RAM (Random Access Memory)) 123 is a working memory. The memory (EEPROM (Electrically Erasable and Programmable Read Only Memory)) 124 is a memory for holding data even for a period during which the image capturing apparatus 100 is in the power-off state, on which various setting conditions, etc., are recorded.

The processor (a CPU (Central Processing Unit) etc.) 121 is the center portion that performs control and the like of the overall operation of the image capturing apparatus 100, and is designed to control the driving of each member of the image capturing apparatus 100 to totally control the operation. At the time of image capture, the processor 121 generates a control signal on the basis of a user's operation input from the operation unit 114, camera-shake information from the gyro-sensor 112, image information from the DSP 115, and judgment information from the image recognition unit 118. Then, the generated control signal is output to the motor driver 109, the flash light emitting unit 113, the vertical driver 110, the TG 111, and the like to cause the lens 102, the aperture mechanism 103, and the like to operate, thereby controlling exposure, white balance, focus, flash, and the like.

In addition, in a case where image data on which image processing has been performed by the DSP 115 is to be recorded, the processor 121 transmits a control signal to the DSP 115 in accordance with a user's operation input from the operation unit 114. Then, the image data on which compression processing has been performed by the DSP 115 is recorded on the recording device 117 as a still image file. In addition, in a case where a still image file recorded on the recording device 117 is to be displayed, the processor 121 transmits a control signal to the DSP 115 in accordance with a user's operation input from the operation unit 114. Then, an image corresponding to the still image file recorded on the recording device 117 is displayed on the monitor 116.

In addition, the processor 121 controls bracketing capture in accordance with a user's operation input from the operation unit 114. Here, bracketing capture is a captured image recording process of capturing a plurality of successive images of the subject for a short period of time while changing the image capturing conditions and recording the images. In a case where this bracketing capture is performed, the bracketing capture is performed using image capturing conditions for which each image capture parameter has been changed with regard to one or a plurality of image capturing condition objects. Note that the image capturing condition objects include, for example, any of the exposure value, the aperture value, the white balance, the focus, the ISO sensitivity, the shutter speed, the depth of field, and the presence or absence of flash, a combination thereof, and the like. In addition, in an embodiment of the present invention, at least one image capturing condition among a user-set bracketing capture condition and an auto-bracketing capture condition is used to perform bracketing capture. Here, the user-set bracketing capture condition is an image capturing condition that is set by a user's manual operation from the operation unit 114. In addition, the auto-bracketing capture condition is an image capturing condition that is set on the basis of the judgment information output from the image recognition unit 118.

In addition, the processor 121 has a learning function for learning user's preferred images on the basis of image data recorded on the recording device 117 and reflecting them in the setting of the auto-bracketing capture condition. This learning function will be explained in detail with reference to FIG. 3.

FIG. 2 is a diagram illustrating an example external configuration of the image capturing apparatus 100 in the embodiment of the present invention. Part (a) of FIG. 2 is a top view illustrating the external appearance of the image capturing apparatus 100, part (b) of FIG. 2 is a front view illustrating the external appearance of the image capturing apparatus 100, and part (c) of FIG. 2 is a rear view illustrating the external appearance of the image capturing apparatus 100. The image capturing apparatus 100 includes a zoom lens 501, a focus lens 502, an aperture 503, an imager 504, a flash device 505, a liquid crystal display unit 506, a power switch 507, and a release switch 508. In addition, the image capturing apparatus 100 includes a zoom button 509, a mode dial 510, an up/down/left/right operation button 511, a set button 512, and a cancel button 513. Here, a digital still camera in which the operation of selecting an image, a button, or the like (for example, the operation of pressing a button) to be displayed on the liquid crystal display unit 506 is performed using operation members disposed on an outer side surface, such as the up/down/left/right operation button 511 and the set button 512 is illustrated by way of example. Note that the zoom lens 501, the focus lens 502, the aperture 503, and the imager 504 are incorporated in the image capturing apparatus 100 and are therefore indicated by broken lines in FIG. 2.

The zoom lens 501 is a lens that is driven back and forth with respect to the subject in order to enlarge or reduce the subject included in a captured image. The focus lens 502 is a lens that is used for focusing on a desired object included in the subject. Note that the zoom lens 501 and the focus lens 502 correspond to the lens 102 illustrated in FIG. 1.

In addition, the aperture 503, the imager 504, the flash device 505, and the liquid crystal display unit 506 correspond to the aperture mechanism 103, image capturing element 104, flash light emitting unit 113, and monitor 116 illustrated in FIG. 1, respectively, and are not explained in detail herein. In addition, the power switch 507, the release switch 508, the zoom button 509, the mode dial 510, the up/down/left/right operation button 511, the set button 512, and the cancel button 513 correspond to the operation unit 114 illustrated in FIG. 1.

The power switch 507 is a switch that switches between the power-on/off state of the image capturing apparatus 100. The release switch 508 is a switch for performing a shutter operation, and is full-pressed or half-pressed by a user. For example, in a case where the release switch 508 is full-pressed, optimum auto-focus control and auto control for image capture are performed, and image data that is being captured at the time of full press is recorded on the recording device 117. In addition, in a case where the release switch 508 is full-pressed in a case where a bracketing capture mode has been set, a plurality of pieces of image data that are being captured at the time of full press are recorded on the recording device 117. Here, the bracketing capture mode is an image capture mode that is set in a case where bracketing capture is to be performed. Note that also in a case where the release switch 508 is half-pressed, optimum auto-focus control or auto control for image capture is performed. In such a case where it is half-pressed, for example, focus lock in which the focus is locked once is performed.

The zoom button 509 is a button that receives a zoom operation performed by a user, and the zoom function is controlled in accordance with the content of the received zoom operation so that the subject included in a captured image can be enlarged or reduced. The mode dial 510 is a dial for setting each mode. For example, the bracketing capture mode, an image display mode for displaying an image recorded on the recording device 117, or the like is set by operating the mode dial 510.

The up/down/left/right operation button 511 is an operation button that is used in a case where an item displayed on the liquid crystal display unit 506, such as a button or an image, is selected, and the item currently being selected is moved up, down, left, and right in accordance with the portion pressed. Note that the operation of the up/down/left/right operation button 511 will be explained in detail with reference to FIGS. 6 to 10.

The set button 512 is a button that is used in the case of deciding the selection state of each item being displayed on the liquid crystal display unit 506. The cancel button 513 is a button that is used for canceling the decision in a case where the selection state of each item being displayed on the liquid crystal display unit 506 has been decided.

Figure 3:
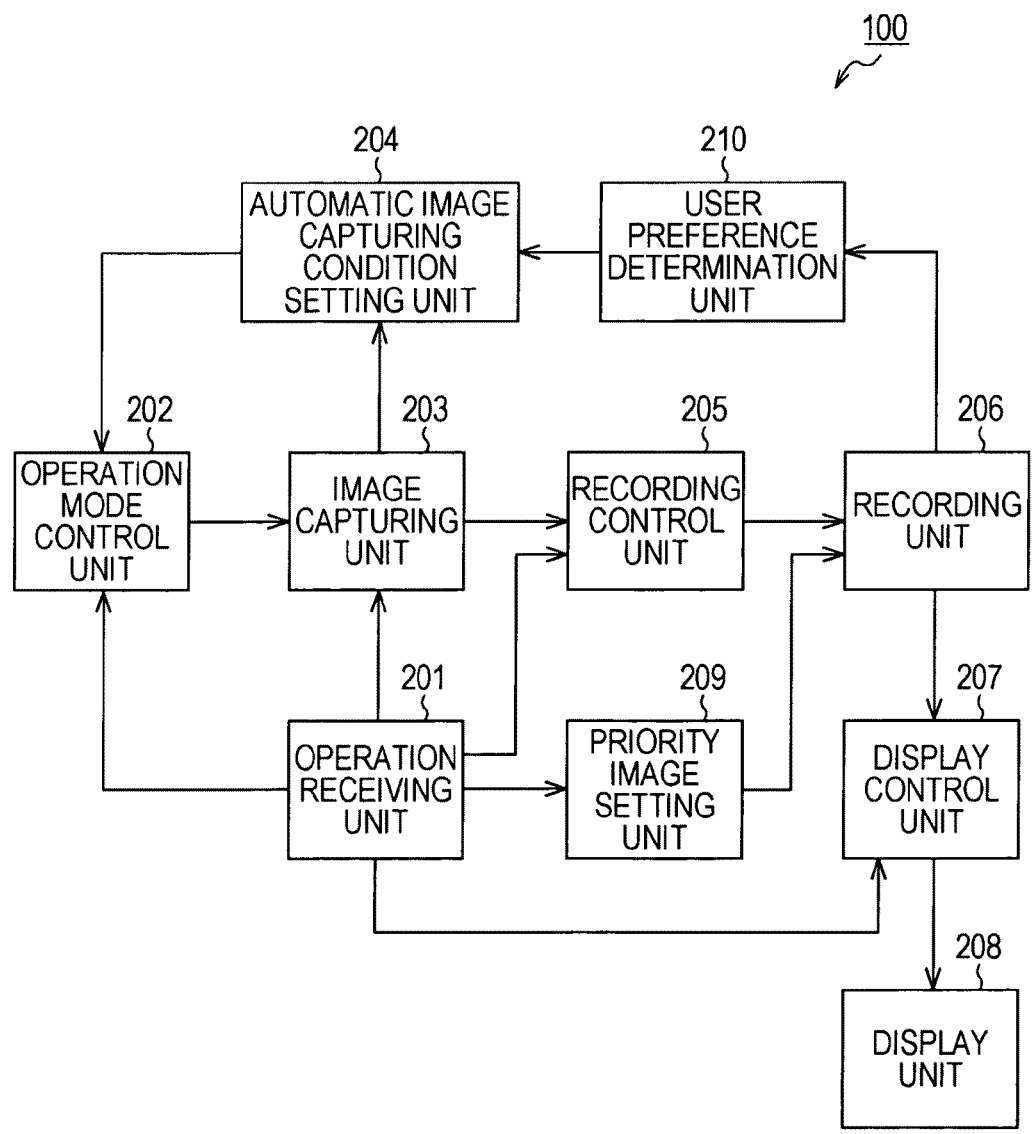
FIG. 3 is a block diagram illustrating an example functional configuration of the image capturing apparatus 100 in the embodiment of the present invention.

FIG. 3 is a block diagram illustrating an example functional configuration of the image capturing apparatus 100 in the embodiment of the present invention. The image capturing apparatus 100 includes an operation receiving unit 201, an operation mode control unit 202, an image capturing unit 203, an automatic image capturing condition setting unit 204, a recording control unit 205, a recording unit 206, a display control unit 207, a display unit 208, a priority image setting unit 209, and a user preference determination unit 210.

The operation receiving unit 201 is designed to receive an operation input from a user, and outputs this operation input to the operation mode control unit 202, the image capturing unit 203, the recording control unit 205, the display control unit 207, and the priority image setting unit 209. The operation receiving unit 201 receives, for example, a recording instruction operation for recording a captured image generated by the image capturing unit 203 on the recording unit 206. In addition, the operation receiving unit 201 receives, for example, a selection operation for setting a priority image from among captured images recorded on the recording unit 206. In addition, the operation receiving unit 201 receives, for example, a setting instruction operation for setting each display mode for causing a captured image recorded on the recording unit 206 to be displayed on the display unit 208. These will be explained in detail with respect to each unit. Note that the operation receiving unit 201 corresponds to, for example, the operation unit 114 illustrated in FIG. 1.

The operation mode control unit 202 is designed to control the operation mode of the image capturing unit 203 on the basis of the operation input from the operation receiving unit 201 and the automatic image capturing condition from the automatic image capturing condition setting unit 204. Here, in a case where the bracketing capture mode has been set, the operation mode control unit 202 sets a bracketing capture condition, and supplies the set bracketing capture condition to the image capturing unit 203. As this bracketing capture condition, at least one of the user-set bracketing capture condition and the auto-bracketing capture condition is set. This auto-bracketing capture condition is set on the basis of the automatic image capturing condition output from the automatic image capturing condition setting unit 204. For example, in a case where the user-set bracketing capture condition has been set, the image capturing unit 203 is controlled so as to perform bracketing capture using this user-set bracketing capture condition and the auto-bracketing capture condition. In addition, for example, in a case where the user-set bracketing capture condition has not been set, the image capturing unit 203 is controlled so as to perform bracketing capture only using the auto-bracketing capture condition. Note that the operation mode control unit 202 corresponds to, for example, the control unit 120 illustrated in FIG. 1.

The image capturing unit 203 is designed to capture an image of a subject on the basis of the control of the operation mode control unit 202 to generate a captured image, and outputs the generated captured image to the automatic image capturing condition setting unit 204 and the recording control unit 205. In addition, in a case where a start instruction operation for instructing the start of bracketing capture has been received by the operation receiving unit 201, the image capturing unit 203 perform image capture on a subject to generate a plurality of captured images in accordance with the bracketing capture condition supplied from the operation mode control unit 202. Then, the plurality of generated captured images are sequentially output to the recording control unit 205. Note that the image capturing unit 203 corresponds to, for example, the image capturing element 104, analog signal processing unit 105, A/D conversion unit 106, and DSP 115 illustrated in FIG. 1. In addition, the image capturing unit 203 corresponds to, for example, the lens 102, aperture mechanism 103, lens driving motor 107, aperture driving motor 108, motor driver 109, vertical driver 110, TG 111, gyro-sensor 112, and flash light emitting unit 113 illustrated in FIG. 1.

The automatic image capturing condition setting unit 204 is designed to judge the subject itself included in a captured image generated by the image capturing unit 203, the conditions of the subject, the ambient conditions, etc., and to set an automatic image capturing condition on the basis of these judgment results (judgment information). Then, the set automatic image capturing condition is supplied to the operation mode control unit 202. Here, the automatic image capturing condition is an image capturing condition that is determined to be optimum for the current state of the subject. Note that the automatic image capturing condition setting unit 204 corresponds to, for example, the image recognition unit 118 and control unit 120 illustrated in FIG. 1.

The recording control unit 205 is designed to record a captured image generated by the image capturing unit 203 on the recording unit 206 on the basis of the content of the operation received by the operation receiving unit 201. In addition, in a case where a start instruction operation of bracketing capture has been received with the bracketing capture mode set, the recording control unit 205 adds the same group identifier to the series of plurality of captured images generated by the image capturing unit 203. Then, these images are recorded on the recording unit 206. Note that in an embodiment of the present invention, a captured image recorded by bracketing capture will be referred to as a bracketing-captured image and will be explained. In addition, a plurality of captured images recorded with the same group identifier added thereto by a single bracketing-capture operation will be referred to as a bracketing-captured image group and will be explained. Here, a group identifier is recorded in, for example, an Exif (Exchangeable image file format) makernote (illustrated in FIG. 5). The addition of a group identifier allows individual captured images recorded by the same bracketing capture to be associated with each other. In addition, when a plurality of captured images with the same group identifier added thereto are recorded on the recording unit 206, the recording control unit 205 allocates these individual images to the same folder. Note that the recording control unit 205 corresponds to the control unit 120 illustrated in FIG. 1.

The recording unit 206 is designed to record a captured image generated by the image capturing unit 203 on the basis of the control of the recording control unit 205. In addition, a plurality of captured images with the same group identifier added thereto are recorded on the recording unit 206 in association with one another. Here, the data recorded on the recording unit 206 has a folder configuration composed of main group folders and sub-group folders. Then, a series of a plurality of captured images with the same group identifier added thereto are allocated to the same main group folder. This folder configuration will be explained in detail with reference to FIG. 4. In addition, the recording unit 206 corresponds to, for example, the recording device 117 illustrated in FIG. 1.

The display control unit 207 is designed to perform control so that a captured image recorded on the recording unit 206 is displayed on the display unit 208 on the basis of the content of the operation received by the operation receiving unit 201. Specifically, in a case where a setting instruction operation for setting a priority image selection mode has been received by the operation receiving unit 201, images with group identifiers added thereto are extracted from among captured images recorded on the recording unit 206, and are displayed on the display unit 208 in units of group identifiers. Here, the priority image selection mode is a mode for selecting a priority image from among the captured images recorded on the recording unit 206. In addition, the priority image is an image that is set on the basis of a user selection among bracketing-captured images with the same group identifier added thereto. In addition, in a case where a setting instruction operation of a display mode for displaying an image recorded on the recording unit 206 has been received by the operation receiving unit 201, in accordance with this instructed display mode, an image recorded on the recording unit 206 is displayed on the display unit 208. Note that the display control unit 207 corresponds to, for example, the control unit 120 illustrated in FIG. 1.

The display unit 208 is designed to display an image recorded on the recording unit 206 on the basis of the control of the display control unit 207. The display unit 208 corresponds to, for example, the monitor 116 illustrated in FIG. 1.

The priority image setting unit 209 is designed to, on the basis of an operation input from the operation receiving unit 201, set a priority image on the basis of a user selection from among captured images recorded on the recording unit 206. Specifically, a bracketing-captured image selected by a user from among a bracketing-captured image group recorded on the recording unit 206 is set as a priority image. Here, in a case where a priority image is selected by a user, for example, bracketing-captured images with the same identifier added thereto are displayed on the display unit 208 on the basis of the control of the display control unit 207. Then, a priority image is set by the user's selection operation from among the plurality of bracketing-captured images being displayed on the display unit 208. The setting of a priority image is performed by, for example, adding priority information to a bracketing-captured image selected by a user. In addition, the priority image setting unit 209 allocates, for example, a priority image to a main group folder and further allocates a bracketing-captured image that is not selected as a priority image to a sub-group folder. These allow a priority image and a bracketing-captured image other than the priority image to be distinguished from each other. The setting of a priority image in this manner allows a bracketing-captured image to be controlled so that only the priority image is displayed at the time of normal image reproduction (for example, preview or slide show). This priority information can be recorded, for example, similarly to group identifiers, in an Exif makernote. Note that the priority image setting unit 209 corresponds to, for example, the control unit 120 illustrated in FIG. 1.

The user preference determination unit 210 is designed to learn images preferred by a user and images not preferred by the user through comparison analysis on the basis of the captured images recorded on the recording unit 206 and to generate user preference information that is information regarding user's favorite image capturing conditions. Specifically, the user preference determination unit 210 learns images preferred by a user and images not preferred by the user through comparison analysis on bracketing-captured images, on the basis of a priority image and a bracketing-captured image other than the priority image, and generates user preference information. For example, the user preference determination unit 210 learns a priority image using a statistical technique to judge the features of images preferred by the user, and generates user preference information on the basis of the judged features of the images preferred by the user. Then, the automatic image capturing condition setting unit 204 sets an automatic image capturing condition by taking the user preference information generated by the user preference determination unit 210, together with the judgment information, into consideration.

However, depending on the current state of the subject, functional reasons of the image capturing apparatus 100, or performance reasons of the image capturing apparatus 100, in some cases, image capture cannot be performed under image capturing conditions that take user preference information into consideration. In this case, there is a risk that image capturing conditions that take user preference into consideration cannot be set. Accordingly, in an embodiment of the present invention, a bracketing-captured image other than a priority image is learned using a statistical technique to judge the features of images not preferred by the user. Then, user non-preference information that is information regarding user's unfavorite image capturing conditions is generated on the basis of the judged features of the images not preferred by the user. Then, the automatic image capturing condition setting unit 204 sets an automatic image capturing condition by taking the user non-preference information generated by the user preference determination unit 210, together with the judgment information, into consideration. In this manner, if the features of images not preferred by a user can be judged, an image capturing condition for preventing an image not preferred by a user from being captured can be set.

In this manner, by setting an automatic image capturing condition by taking user preference information and user non-preference information into consideration, the number of options for setting image capturing conditions can be increased. Thus, even in a case where image capture based on an image capturing condition that takes user preference information into consideration cannot be performed, at least an image capturing condition for preventing an image not preferred by a user from being captured can be set. In addition, the increase in the number of options for setting automatic image capturing conditions can reduce failure caused by recording a captured image.

In this manner, in the learning with the use of a statistical technique, an image for which the user preference has been decided is an important factor. Therefore, in an embodiment of the present invention, a bracketing-captured image that is not selected as a priority image is also recorded on the recording unit 206 so that the user preference determination unit 210 can use it. For example, a bracketing-captured image that is not selected as a priority image can be allocated to a sub-folder (illustrated in FIG. 4) in the recording unit 206 and recorded. In this manner, the recording of an image for which the user preference has been decided is equivalent to the provision of a database regarding the user preference in the image capturing apparatus 100, and self-preference learning inside the image capturing apparatus 100 can be automatically performed. Note that user preference information and user non-preference information are updated at any time and are generated, whereby user preference can further be reflected in the setting of an image capturing condition. In addition, instead of generating user preference information and user non-preference information, the limit values or the like of individual image capture parameters of images preferred by a user are determined on the basis of a bracketing-captured image that is not selected as a priority image, and an image capturing condition may be set using the limit values or the like. Note that the user preference determination unit 210 corresponds to, for example, the control unit 120 illustrated in FIG. 1.

Figure 4:
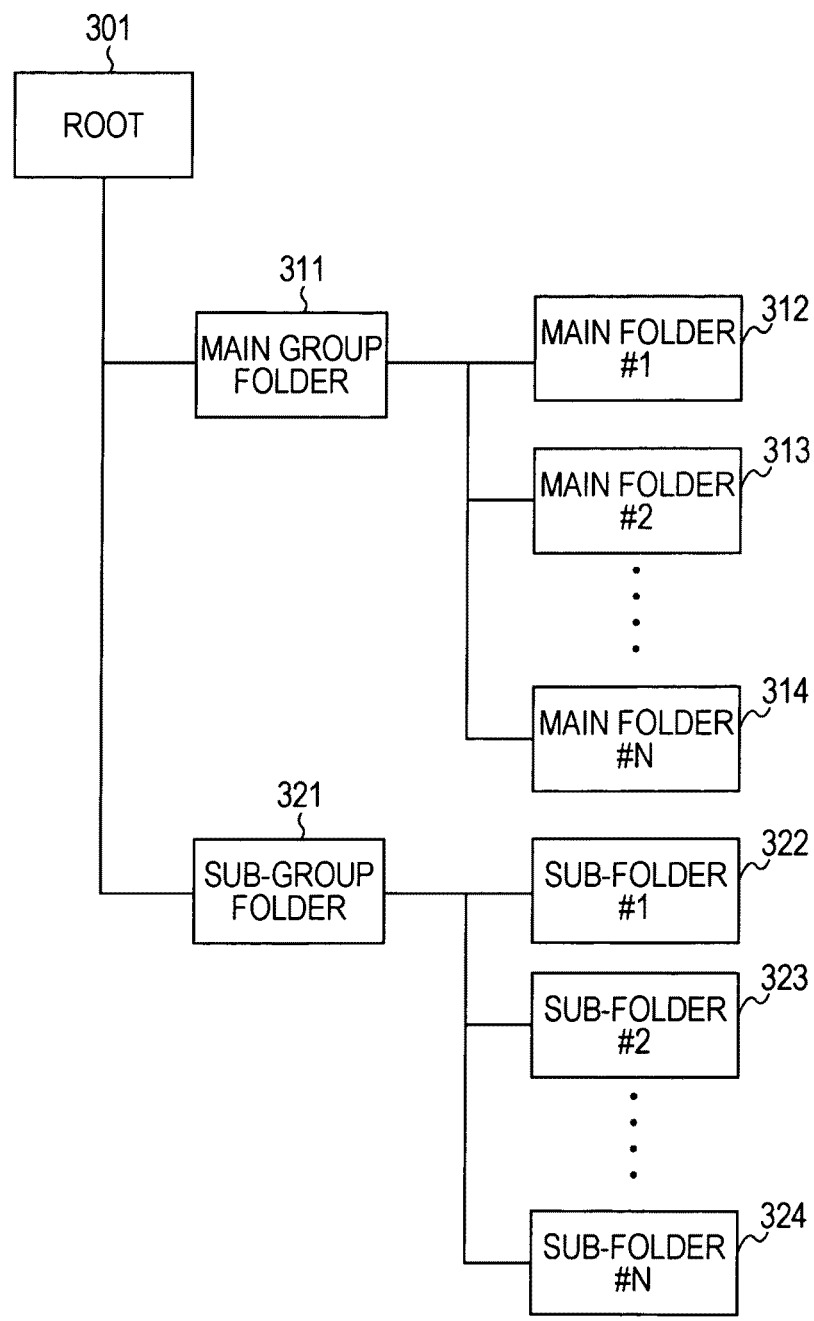
FIG. 4 is a diagram illustrating an example configuration of folders of data recorded in a recording unit 206 in the embodiment of the present invention.

FIG. 4 is a diagram illustrating an example configuration of folders of data recorded on the recording unit 206 in the embodiment of the present invention.

The data recorded on the recording unit 206 has a hierarchical folder configuration composed of a root 301, a plurality of folders 311 to 314 and 321 to 324 belonging to the hierarchy lower than the root 301. Specifically, the main group folder 311 and the sub-group folder 321 belong to the hierarchy lower than the root 301. In addition, the main folders (#1) 312 to (#N) 314 belong to the hierarchy lower than the main group folder 311. In addition, the sub-folders (#1) 322 to (#N) 324 belong to the hierarchy lower than the sub-group folder 321. Here, N is a positive integer.

Here, in a case where bracketing capture is performed, a plurality of images with the same group identifier added thereto are recorded on the recording unit 206. On the occasion of this recording, a plurality of images with the same group identifier added thereto are allocated to the same main folder belonging to the hierarchy lower than the main group folder 311. Then, in a case where the selection operation of selecting a priority image is performed by a user on the plurality of images with the same group identifier added thereto, an image that is not selected as a priority image is allocated to a sub-folder belonging to the hierarchy lower than the sub-group folder 321. That is, an image that is not selected as a priority image is moved from a main folder to a sub-folder. On the other hand, it is assumed that an image that is selected as a priority image is left to have been allocated to a main folder belonging to the hierarchy lower than the main group folder 311. That is, an image with priority information added thereto (priority image) is allocated to a main folder belonging to the hierarchy lower than the main group folder 311, and an image with no priority information added thereto is allocated to a sub-folder belonging to the hierarchy lower than the sub-group folder 321. In addition, images with the same group identifier added thereto are allocated to a main folder and a sub-folder to which the same number (#) is added. For example, an image (image other than a priority image) having added thereto the same group identifier as the group identifier to which an image (priority image) allocated to the main folder (#1) 312 is added is allocated to the sub-folder (#1) 322.

FIG. 5 is a diagram illustrating an overview of a file structure of a still image file recorded using the DCF (Design rule for Camera File system) standard. DCF is a file system standard for implementing the mutual use of images via a recording medium between devices such as a digital still camera and a printer. In addition, in DCF, how to determine a file name in the case of the recording on a recording medium based on Exif and the folder configuration are specified. Exif is a standard for adding image data and camera information to an image file, and is designed to specify a format (file format) for recording image files.

A still image file 410 is a still image file recorded using the DCF standard, and is configured using, as illustrated in part (a) of FIG. 5, attached information 411 and image information 412. The image information 412 is image data (captured image) generated by, for example, the image capturing unit 203.

The attached information 411 is configured using, as illustrated in part (b) of FIG. 5, attribute information 413 and makernote 414. The attribute information 413 is attribute information or the like regarding the still image file 410, and includes, for example, the update date and time of image capture, the image size, color space information, the vendor name, and the like.

In general, the makernote 414 is an area in which data unique to a user is recorded, and is an extended area on which each vendor is free to record information (TAGID=37500, MakerNote). Here, in an embodiment of the present invention, as illustrated in part (c) of FIG. 5, an group identifier 415 and priority information 416 are recorded in the makernote 414.

Figure 6:
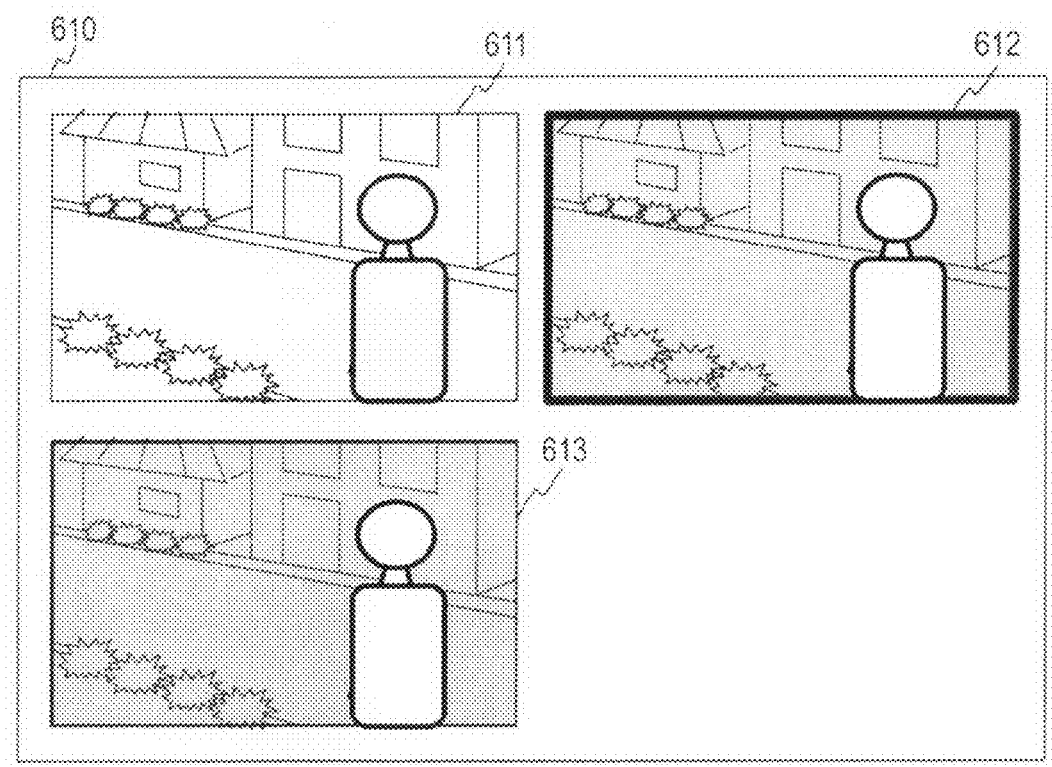
FIG. 6 is a diagram illustrating an example display of a bracketing-captured image displayed on a display unit 208 in the embodiment of the present invention.

FIG. 6 is a diagram illustrating an example display of a bracketing-captured image displayed on the display unit 208 in the embodiment of the present invention.

A priority image selection screen 610 is a screen on which bracketing-captured images included in the same bracketing-captured image group (bracketing-captured images with the same group identifier added thereto) are displayed in a list and on which, for example, bracketing-captured images 611 to 613 are displayed. Here, since the bracketing-captured images 611 to 613 are captured images recorded by bracketing capture, the same subject is included. Note that although the subjects included in the respective bracketing-captured images are the same, the respective bracketing-captured images have been captured using different image capturing conditions. Thus, as illustrated in FIG. 6, the images themselves are different from each other.

In addition, in an embodiment of the present invention, an example where a user selects a priority image from among the bracketing-captured images that are being displayed on the priority image selection screen 610, thereby setting a priority image is illustrated. Note that the priority image selection screen 610 is displayed in a case where, for example, a setting instruction operation of the priority image selection mode has been received by the operation receiving unit 201.

Here, on the priority image selection screen 610, a solid line selection image marker is displayed so as to be added to the periphery of a bracketing-captured image selected by a user. Note that in the state where the selection operation has not yet been performed by the user, the selection image marker may be added to the periphery of a bracketing-captured image being displayed at a specific position (initial marker placement position). In the example illustrated in FIG. 6, a case where the position of an upper right portion of the priority image selection screen 610 is set as the initial marker placement position and where the bracketing-captured image 612 has the selection image marker added therein in the state where the selection operation has not yet been performed by the user is illustrated.

In a case where a user selects a priority image in the state where the priority image selection screen 610 is being displayed on the display unit 208, for example, the selection image marker is moved to the desired bracketing-captured image by using the up/down/left/right operation button 511 illustrated in FIG. 2. For example, in a case where the bracketing-captured image 611 is selected as a priority image, the selection image marker is moved from the bracketing-captured image 612 to the bracketing-captured image 611 by using the up/down/left/right operation button 511. An example display in a case where the bracketing-captured image 611 has been selected in this manner by a user on the priority image selection screen 610 is illustrated in FIG. 7.

Figure 7:
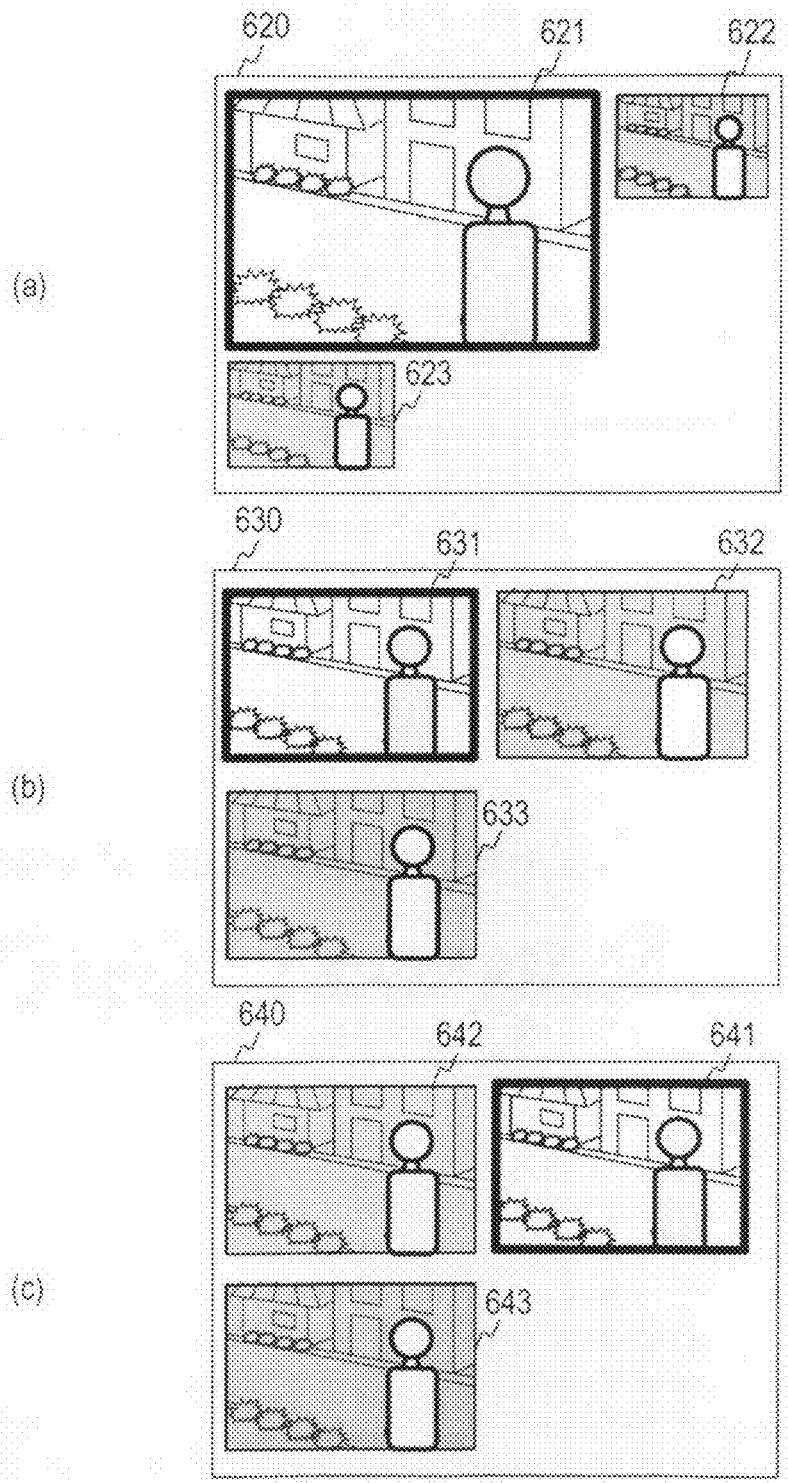
FIG. 7 is a diagram illustrating an example display on the occasion of the selection of a priority image from among bracketing-captured images being displayed on the display unit 208 in the embodiment of the present invention.

FIG. 7 is a diagram illustrating an example display on the occasion of the selection of a priority image from among bracketing-captured images being displayed on the display unit 208 in the embodiment of the present invention. Part (a) of FIG. 7 illustrates an example display in which a bracketing-captured image 621 selected by the user is displayed in an enlarged manner. In addition, part (b) of FIG. 7 illustrates an example display in which the selection image marker is added to the periphery of a bracketing-captured image 631 selected by the user. In addition, part (c) of FIG. 7 illustrates an example display in which a bracketing-captured image 641 selected by the user is placed and is displayed at a specific position (selected-image placement position) on the screen. Note that in the example illustrated in part (c) of FIG. 7, a case where the position of the upper right portion of the screen is set as the selected-image placement position is illustrated. In addition, the bracketing-captured images 621, 631, and 641 selected by the user correspond to the bracketing-captured image 611 illustrated in FIG. 6. In this manner, the highlighted display of a bracketing-captured image selected by a user on the priority image selection screen allows the user to easily recognize the bracketing-captured image currently being selected.

Note that the method of highlighting a selected image may be implemented using any of the methods of parts (a) to (c) of FIG. 7 or any other method. In addition, in a case where the number of bracketing-captured images to be displayed in a list on the priority image selection screen is large, the bracketing-captured images may be separated into units of a plurality of images and displayed, or may be displayed by scrolling.

Figure 8:
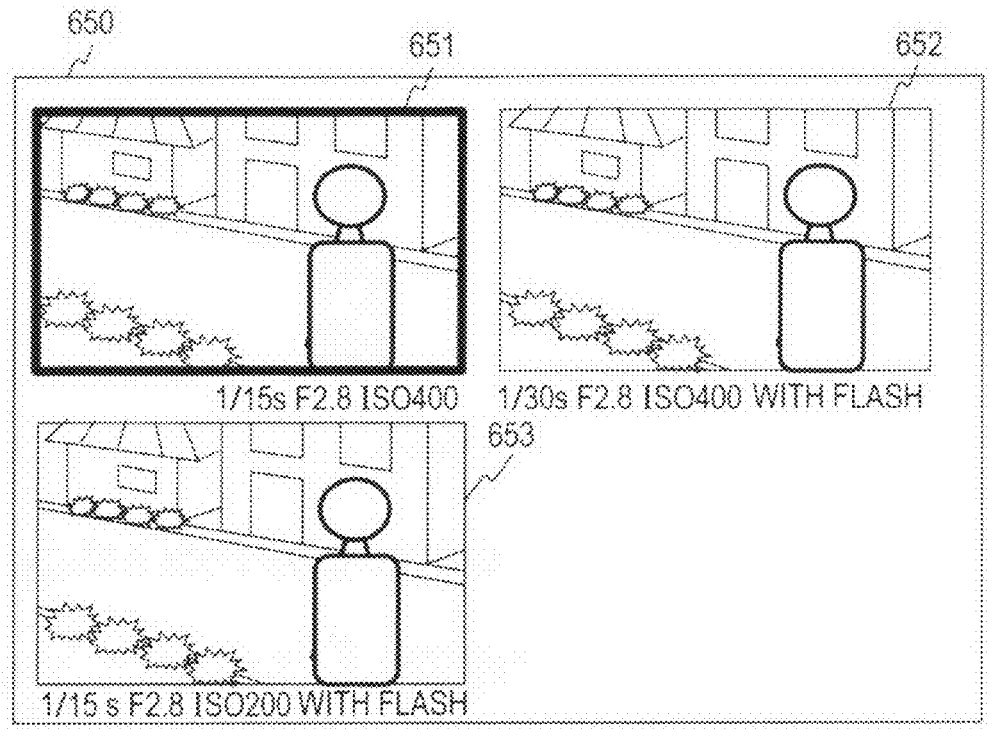
FIG. 8 is a diagram illustrating another example display on the occasion of the selection of a priority image from among bracketing-captured images being displayed on the display unit 208 in the embodiment of the present invention.

FIG. 8 is a diagram illustrating an example display on the occasion of the selection of a priority image from among bracketing-captured images being displayed on the display unit 208 in the embodiment of the present invention. In the example illustrated in FIG. 8, image capturing conditions such as the shutter speed, the ISO sensitivity, the F-value, and with or without flash (flashlight) are added and displayed in lower right portions of bracketing-captured images 651 to 653 being displayed on a priority image selection screen 650, by way of example. For example, in a case where it is difficult to find the difference between individual bracketing-captured images displayed on the display unit 208 on the screen, the image capturing conditions are displayed together with the individual bracketing-captured images, thereby allowing the user to easily select a priority image.

Figure 9:
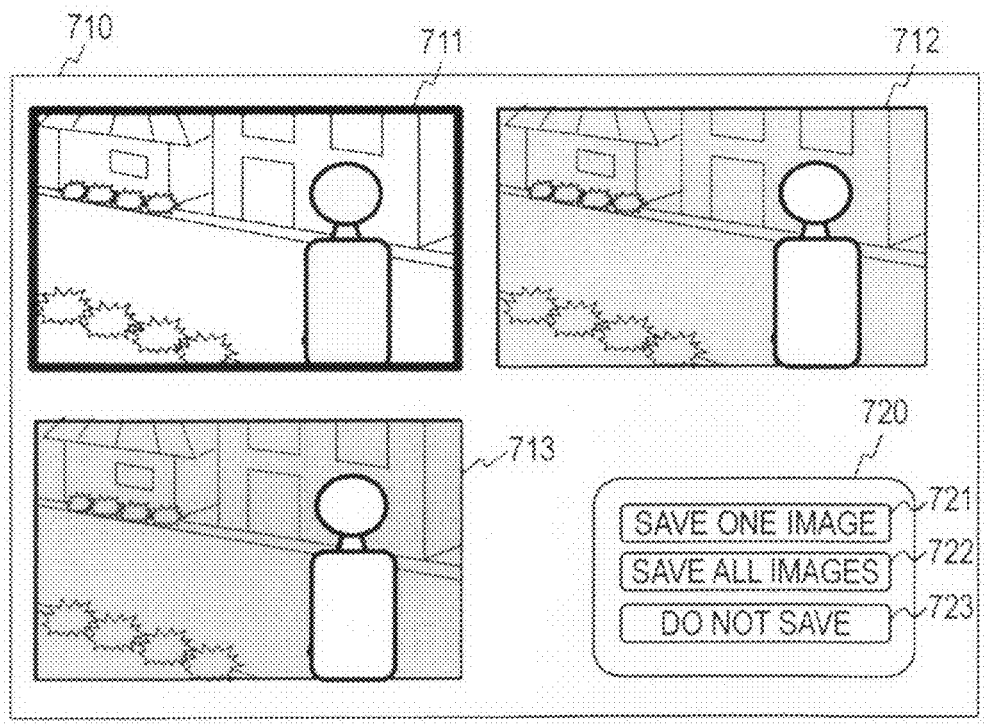
FIG. 9 is a diagram illustrating an example display on the occasion of the selection of a priority image from among bracketing-captured images being displayed on the display unit 208 in the embodiment of the present invention.

FIG. 9 is a diagram illustrating an example display on the occasion of the selection of a priority image from among bracketing-captured images being displayed on the display unit 208 in the embodiment of the present invention. In FIG. 9, an example display of a recording mode selection screen that is displayed after the operation of selecting a desired bracketing-captured image has been performed by the user on the priority image selection screens illustrated in FIGS. 6 to 8 is illustrated.

A recording mode selection screen 710 is a screen that is displayed, for example, after the selection of a bracketing-captured image on a priority image selection screen 610, 620, 630, 640, or 650 illustrated in FIGS. 6 to 8 has been performed by a user and further the selection decision operation for deciding this selection has been performed. This selection decision operation is performed by, for example, pressing the set button 512 illustrated in FIG. 2 by the user in the state where a desired bracketing-captured image has been selected on the priority image selection screen.

On the recording mode selection screen 710, bracketing-captured images 711 to 713 and a recording mode selection view 720 are displayed. In the recording mode selection view 720, a "save one image" button 721, a "save all images" button 722, and a "do not save" button 723 are displayed. Note that it is assumed that the "press", as used in the explanation of each of the buttons illustrated in FIGS. 9, 10, and 15, means a series of operations including, for example, the selection operation performed using the up/down/left/right operation button 511 illustrated in FIG. 2 and the selection decision operation performed using the set button 512 after the selection operation.

The "save one image" button 721 is a button that is pressed in a case where only one bracketing-captured image being displayed on the recording mode selection screen 710 is selected as a priority image. That is, by pressing the "save one image" button 721, a priority image setting process of adding priority information to one bracketing-captured image being selected on the recording mode selection screen 710 is performed. This priority image setting process is performed after an "execute" button 731 illustrated in part (b) of FIG. 10 has been pressed.

The "save all images" button 722 is a button that is pressed in a case where all the bracketing-captured images being displayed on the recording mode selection screen 710 are selected as priority images. That is, by pressing the "save all images" button 722, a priority image setting process of adding priority information to all the bracketing-captured image being displayed on the recording mode selection screen 710 is performed. This priority image setting process is performed after the "execute" button 731 illustrated in part (b) of FIG. 10 has been pressed. Note that even in a case where there are a large number of bracketing-captured images with the same group identifier added thereto and all of them are not being displayed on the recording mode selection screen 710, the "save all images" button 722 is pressed, thereby allowing all of them to be selected as priority images. For example, in a case where the user likes all the bracketing-captured images being displayed and desires to keep all of them aside as priority images, the "save all images" button 722 is pressed. In addition, for example, in a case where individual bracketing-captured images displayed on the display screen of the image capturing apparatus 100 are so small that the user cannot determine a preferred image, the "save all images" button 722 are pressed. In this case, for example, the individual bracketing-captured images can be displayed on another display control apparatus such as a personal computer and a priority image can be selected.

The "do not save" button 723 is a button that is pressed in a case where none of the bracketing-captured images being displayed on the recording mode selection screen is selected as a priority image. For example, in a case where the user does not like any of the bracketing captures being displayed and it is determined that all of them do not need to be kept aside, the "do not save" button 723 is pressed. In addition, in a case where an attempt to select a priority image has been made but all of them are desired to be deleted, the "do not save" button 723 is pressed.

Figure 10:
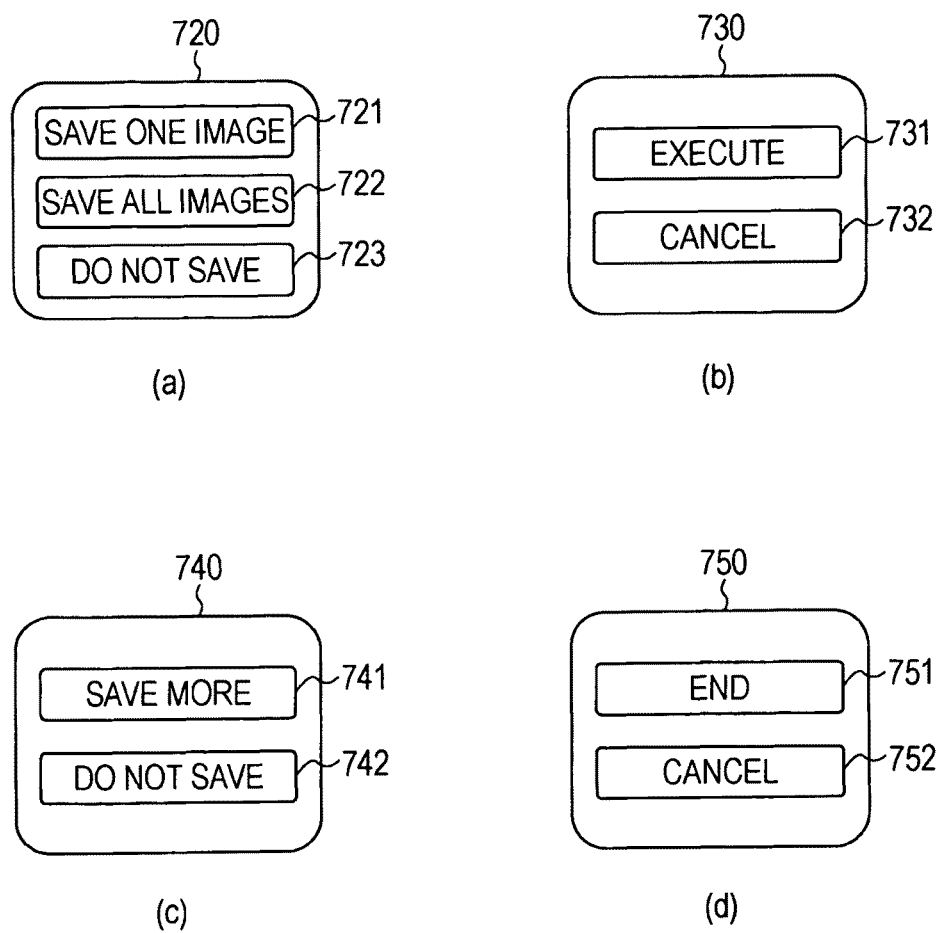
FIG. 10 is a diagram illustrating an example display of individual buttons used for selecting a priority image from among bracketing-captured images being displayed on the display unit 208 in the embodiment of the present invention.

FIG. 10 is a diagram illustrating an example display of the respective buttons used for selecting a priority image from among the bracketing-captured images being displayed on the display unit 208 in the embodiment of the present invention. The respective buttons illustrated in parts (a) to (d) of FIG. 10 are displayed at the same positions as, for example, the display positions on the recording mode selection view 720 illustrated in FIG. 9.

A recording mode selection view 720 illustrated in part (a) of FIG. 10 is the same as the recording mode selection view 720 illustrated in FIG. 9. Part (b) of FIG. 10 illustrates an execution confirmation view 730 that is displayed after the "save one image" button 721 or the "save all images" button 722 has been pressed on the recording mode selection view 720. When the "execute" button 731 is pressed on the execution confirmation view 730, priority information is added to the bracketing-captured image selected on the recording mode selection screen 710, and a save/continue confirmation view 740 illustrated in part (c) of FIG. 10 is displayed. That is, when the "execute" button 731 is pressed after the "save one image" button 721 is pressed, a priority image setting process of adding priority information to one bracketing-captured image being selected on the recording mode selection screen 710 is performed. In addition, when the "execute" button 731 is pressed after the "save all images" button 722 is pressed, a priority image setting process of adding priority information to all the bracketing-captured images being displayed in the recording mode selection screen is performed. On the other hand, when a "cancel" button 732 is pressed on the execution confirmation view 730, a recording mode selection view 720 is displayed.

Part (c) of FIG. 10 illustrates a save/continue confirmation view 740 that is displayed after the "execute" button 731 has been pressed on the execution confirmation view 730. When a "save more" button 741 is pressed on the save/continue confirmation view 740, the recording mode selection view 720 illustrated in part (a) of FIG. 10 is displayed in order to also select another bracketing-captured image as a priority image. On the other hand, when a "do not save" button 742 is pressed, an end confirmation view 750 illustrated in part (d) of FIG. 10 is displayed.

Part (d) of FIG. 10 illustrates the end confirmation view 750 that is displayed after the "do not save" button 723 illustrated in part (a) of FIG. 10 or the "do not save" button 742 illustrated in part (c) of FIG. 10 has been selected. When an "end" button 751 is pressed on the end confirmation view 750, the process of moving a bracketing-captured image targeted for a priority image selection process between folders is performed. That is, a bracketing-captured image that is not selected as a priority image among the bracketing-captured image group targeted for the priority image selection process is allocated to a sub-folder with the same number (#) as that of the current main folder added thereto. In this manner, the process of moving between folders is performed on a bracketing-captured image that is not selected as a priority image among bracketing-captured images having added thereto the same group identifier as the group identifier added to the bracketing-captured image selected as a priority image. After this process of moving between folders has been performed, the priority image selection process ends. On the other hand, when a "cancel" button 752 is pressed on the end confirmation view 750, the recording mode selection view 720 is displayed. The flow of these screen transitions will be explained in detail with reference to a flowchart illustrated in FIG. 15.

Next, the operation of the image capturing apparatus 100 in the embodiment of the present invention will be explained with reference to the drawings.

Figure 11:
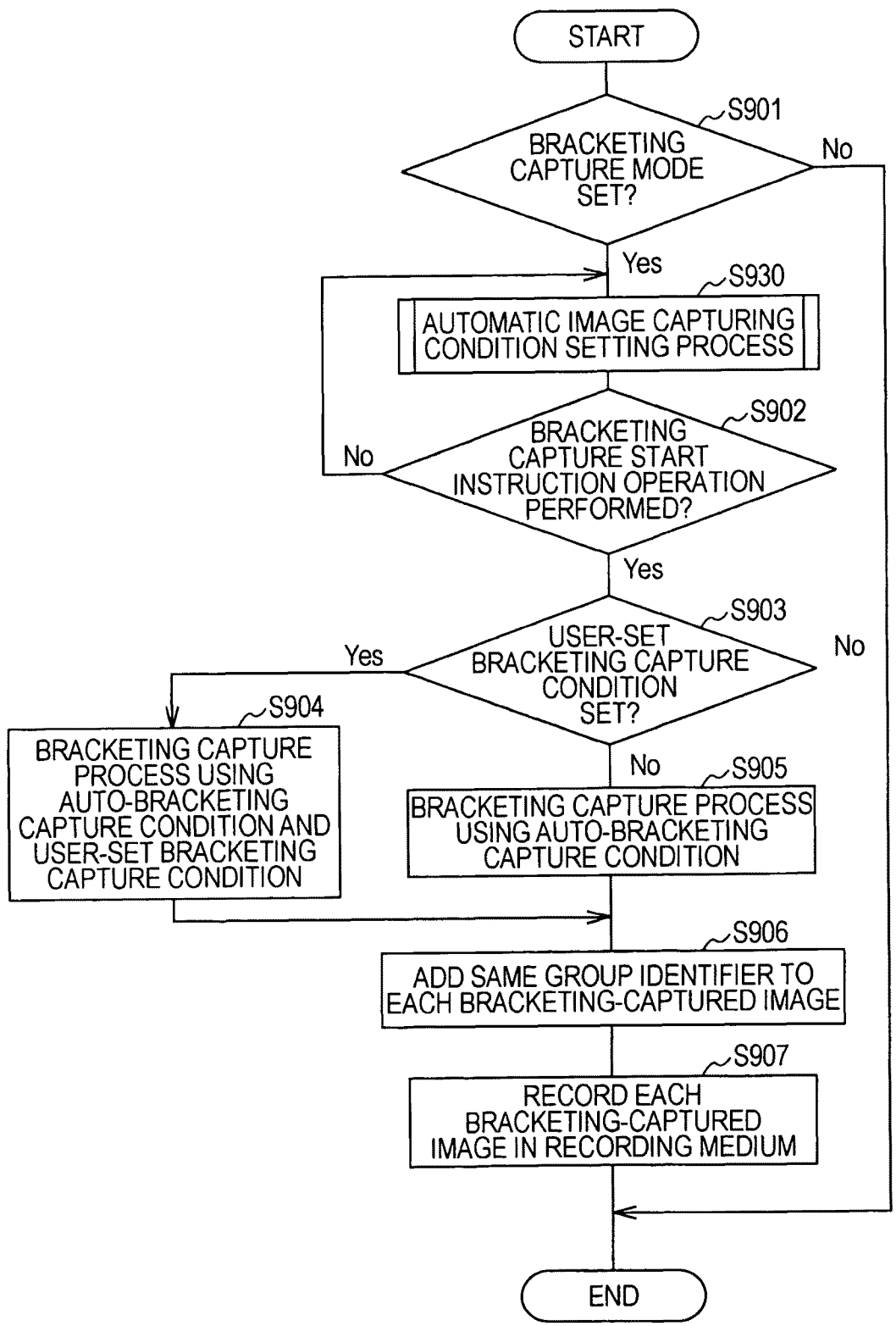
FIG. 11 is a flowchart illustrating a process procedure of a bracketing-captured image recording process performed by the image capturing apparatus 100 in the embodiment of the present invention.

FIG. 11 is a flowchart illustrating a process procedure of a bracketing-captured image recording process performed by the image capturing apparatus 100 in the embodiment of the present invention. In this example, a case where in a case where the user-set bracketing capture condition has been set, bracketing capture is performed using this user-set bracketing capture condition and the auto-bracketing capture condition will be explained by way of example. Note that in a case where the user-set bracketing capture condition has not been set, bracketing capture is performed using only the auto-bracketing capture condition. In addition, in this example, a case where a priority image is selected in accordance with a user operation after the bracketing-capture operation has been completed will be explained by way of example.

First, it is determined whether or not the bracketing capture mode has been set (step S901). When the bracketing capture mode has not been set (step S901), the operation of the bracketing-captured image recording process ends. On the other hand, when the bracketing capture mode has been set (step S901), an automatic image capturing condition setting process for setting the automatic image capturing condition on the basis of a captured image generated by the image capturing unit 203 is performed (step S930). Note that this automatic image capturing condition setting process will be explained in detail with reference to FIGS. 12 and 13.

Subsequently, it is determined whether or not a start instruction operation for starting bracketing capture has been received by the operation receiving unit 201 (step S902). The start instruction operation is performed by, for example, full-pressing the release switch 508 illustrated in FIG. 2 by a user. In a case where this start instruction operation has not been received (step S902), the process returns to step S930. On the other hand, in a case where the start instruction operation has been received (step S902), it is determined whether or not the user-set bracketing capture condition has been set (step S903).

In a case where the user-set bracketing capture condition has been set (step S903), the image capturing unit 203 performs a bracketing capture process using the user-set bracketing capture condition and the auto-bracketing capture condition (step S904). On the other hand, in a case where no bracketing capture conditions base on a user operation have been set (step S903), the image capturing unit 203 performs a bracketing capture process using the auto-bracketing capture condition (step S905).

Subsequently, the recording control unit 205 adds the same group identifier to a plurality of captured images generated by the image capturing unit 203 (step S906). For example, the same group identifier is recorded in the makernote of an image file of each of the captured images. Subsequently, the recording control unit 205 records each of the captured images with the same group identifier added thereto on the recording unit 206 (step S907). On the occasion of this recording, individual captured images with the same group identifier added thereto are allocated to the same main folder.

Figure 12:
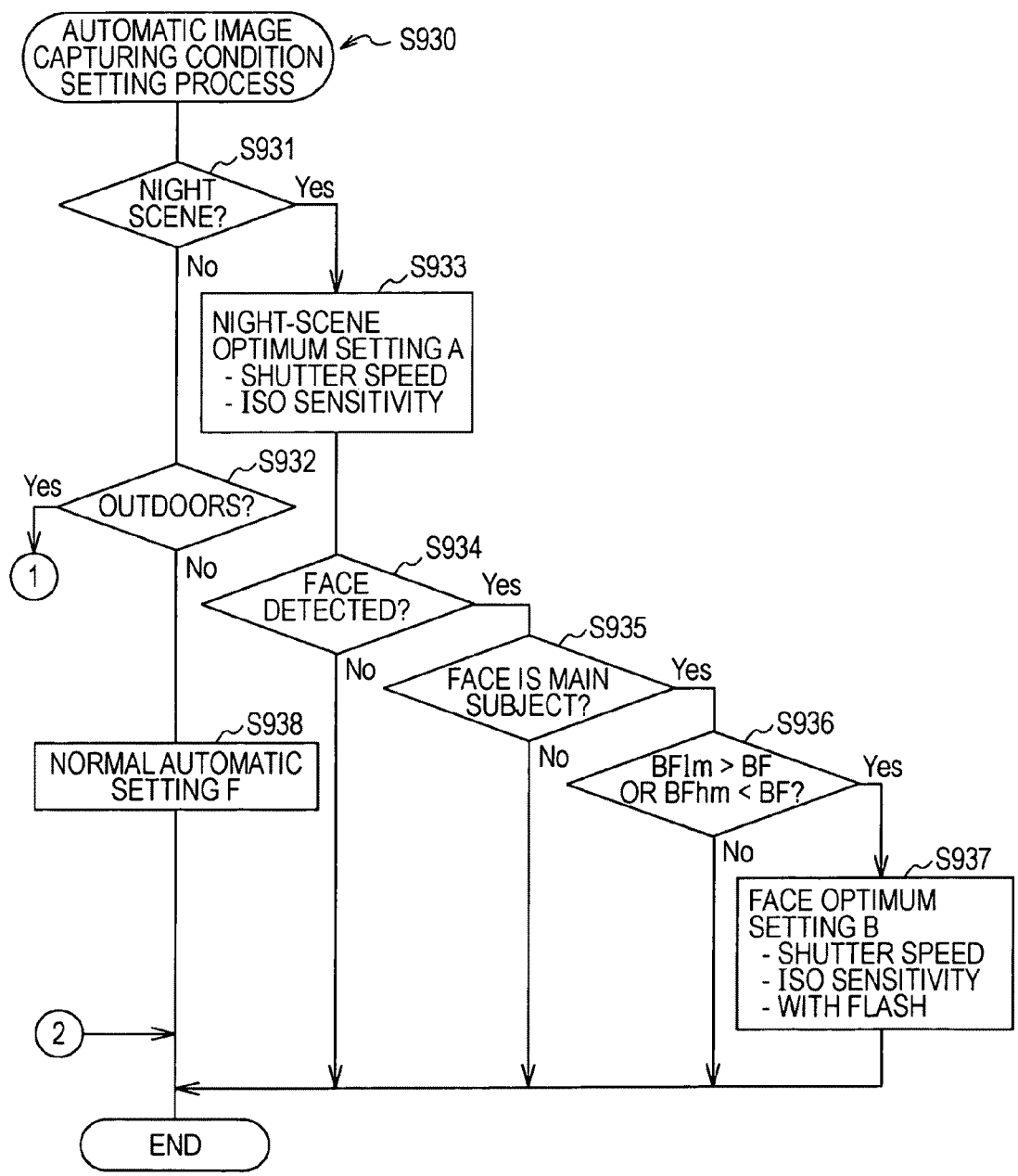
FIG. 12 is a flowchart illustrating a process procedure of an automatic image capturing condition setting process performed by the image capturing apparatus 100 in the embodiment of the present invention.
Figure 13:
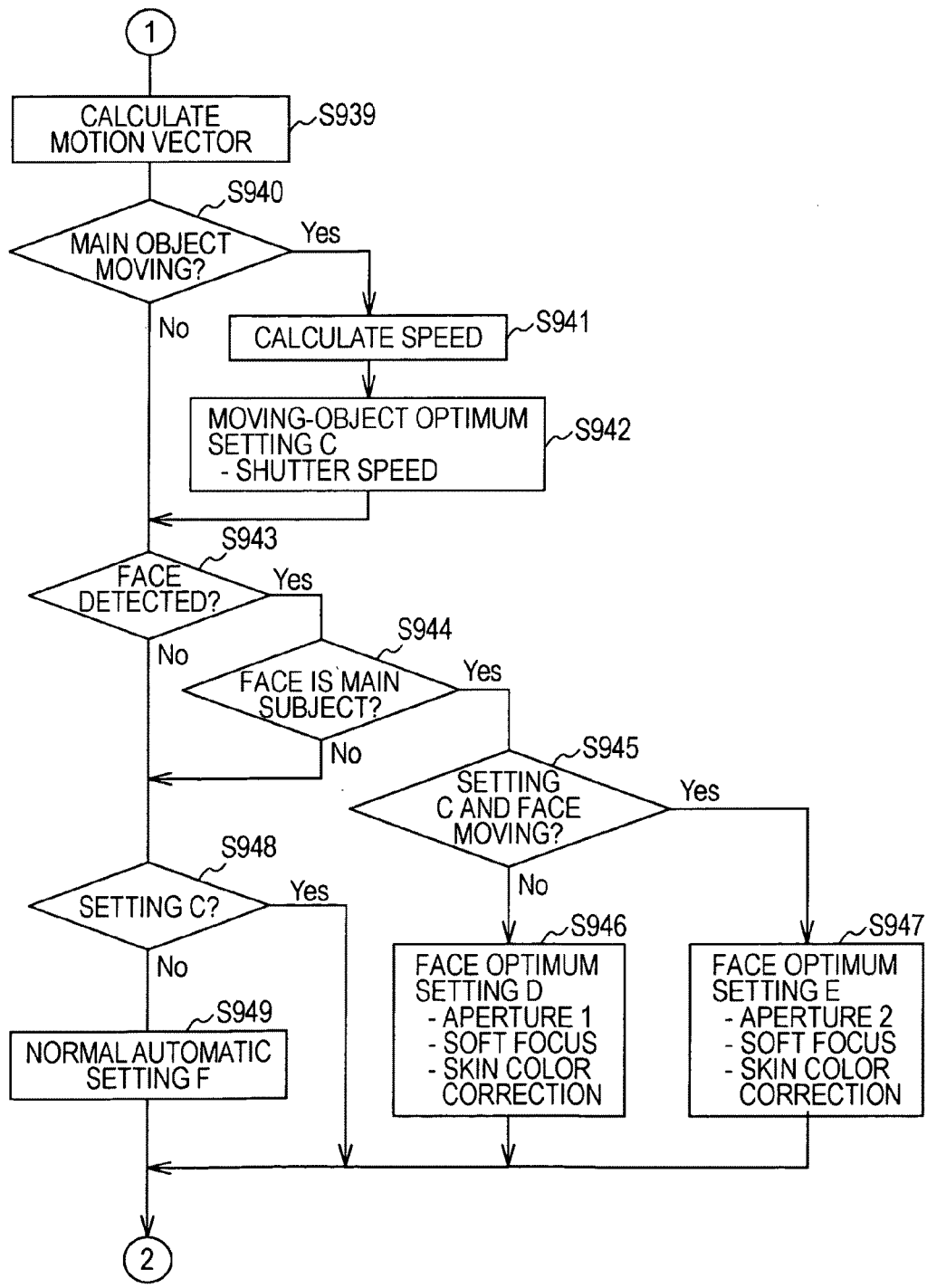
FIG. 13 is a flowchart illustrating a process procedure of the automatic image capturing condition setting process performed by the image capturing apparatus 100 in the embodiment of the present invention.

FIGS. 12 and 13 are flowcharts illustrating a process procedure of an automatic image capturing condition setting process performed by the image capturing apparatus 100 in the embodiment of the present invention (the process procedure of step S930 illustrated in FIG. 11). This automatic image capturing condition setting process is performed by the automatic image capturing condition setting unit 204.

First, it is determined whether or not a captured image generated by the image capturing unit 203 corresponds to a night scene (step S931). For example, it is determined whether or not the image corresponds to a night scene by creating a histogram of luminance levels of the captured image on the entire screen and executing pattern matching of the distribution in the created histogram. In a case where it is determined that the image is an image of a night scene (step S931), a night-scene optimum setting A is set (step S933). Here, the night-scene optimum setting A can contain, for example, a setting in which the aperture is opened as much as possible so that an image of a night scene can be captured with sufficient brightness. Note that in a situation where the illumination is not sufficient even when the aperture is opened as much as possible, the setting can made to reduce the shutter speed. Alternatively, the setting can also be made to increase the ISO sensitivity.

Subsequently, a face detection process is performed on the captured image generated by the image capturing unit 203 (step S934). When no faces are detected, the operation of the automatic image capturing condition setting process ends. In this case, the night-scene optimum setting A is set as the automatic image capturing condition.

On the other hand, in a case where a face has been detected from the captured image generated by the image capturing unit 203 (step S934), it is determined whether or not the detected face is the main subject (step S935). For example, it is determined whether or not the face is the main subject on the basis of personal identification information about the face, the position where the face exists in the captured image, the size of the face in the captured image, the distance from the image capturing apparatus 100 to the face, or the like. In a case where the detected face is not the main subject (step S935), the operation of the automatic image capturing condition setting process ends. In this case, the night-scene optimum setting A is set as the automatic image capturing condition.

In a case where the detected face is the main subject (step S935), the luminance of a face area that is limited to a face portion determined to be the main subject is measured, and the measured luminance value BF is compared with face luminance threshold values BFlm and BFhm (step S936). On the occasion of this luminance measurement, the measurement is performed on the assumption that, for example, optimum camera control for night scenes has been made. In addition, for example, a representative point inside the face is set as a luminance measurement point, and the luminance value at this representative point can be used as a luminance value BF. In addition, the entire face can also be set as measurement points, and the average luminance value that is the average of the luminance values at these measurement points may be used as a luminance value BF. Here, the face luminance threshold values BFlm and BFhm are threshold values for determining whether or not the face has appropriate brightness. The face luminance threshold value BFlm is a threshold value that sets the allowed luminance on the darkest side, and the face luminance threshold value BFhm is a threshold value that sets the allowed luminance on the brightest side. For example, in a case where BFlm>BF, it is supposed that the face determined to be the main subject is too dark. On the other hand, in a case where BFhm<BF, it is supposed that the face determined to be the main subject is too bright. Therefore, in a case where BFlm>BF or BFhm<BF, a face optimum setting B is set so that the brightness of the face determined to be the main subject can become appropriate brightness (step S937), and the operation of the automatic image capturing condition setting process ends. In this case, the night-scene optimum setting A and the face optimum setting B are set as the automatic image capturing condition. Here, the face optimum setting B can contain a setting in which, for example, in the case of increasing the brightness of the face, any of the use of the flashlight, reduction in the shutter speed, and increase in the ISO sensitivity, or a combination thereof is selected.

On the other hand, in a case where BFlm≦BF≦BFhm (step S936), the operation of the automatic image capturing condition setting process ends. In this case, the night-scene optimum setting A is set as the automatic image capturing condition.

Here, one exemplary method for making a face bright will be explained. For example, as described above, any of the use of the flashlight, reduction in the shutter speed, or increase in the ISO sensitivity, or a combination thereof can be used to thereby make a face bright. Note that since the captured image to be generated differs in accordance with the selected method for making a face bright, it is necessary to appropriately change the selection of a method for making a face bright depending on the image capturing condition and the like.

For example, in a case where optimum control for a face included in a captured image is performed, it is supposed that the control is no longer optimum for the background of the face. Therefore, for example, in the state where a user is capturing an image while supposing the background of a face as the main subject, in a case where the image capturing apparatus 100 determines that the face is the main subject, there is a risk that a captured image that is suitable for the user cannot be recorded. In this manner, the determination of the main subject is important.

In addition, for example, even in a case where the main subject has been correctly determined, it is also supposed that it is difficult to perform appropriate control depending on the position or operation state of the main subject. For example, in a case where the main subject is a face, in a case where the face exists at a portion very far away from the image capturing apparatus 100, in some cases, optimum control for the face cannot be performed even with the use of the flashlight. Accordingly, in such a case, the use of the flashlight can be excluded from the options. In addition, in a case where the face is moving, a reduction in the shutter speed causes a risk that optimum control for the face cannot be performed. Accordingly, in such a case, the reduction in the shutter speed can be excluded from the options.

In this manner, factors such as whether or not the amount of light from the flashlight is optimum, whether or not the noise level is within an allowable range, and whether or not camera shake is within an allowable range in the case of reduced shutter speed affect the generation of a captured image, and therefore need to be selected correctly.

However, it is often difficult to limit the aforementioned options to one optimum setting. For example, there are supposed a case where the subject detection capabilities of the image capturing apparatus 100 do not allow one subject situation to be decided and a case where even when the subject has been correctly found, one optimum setting cannot be selected because of the distance, movement, or the like of the subject. In such cases, a plurality of settings are made from options of settings that can possibly become candidates. By performing image capture with the above settings, a situation where none of the captured images preferred by a user can be captured can be avoided. In this manner, in a case where bracketing capture is performed with a plurality of condition settings, there are a large number of captured images to be recorded. However, a priority image can be set by a user selection, and therefore user-preferred images can be easily displayed.

In addition, in a case where it is not determined that the image is an image of a night scene (step S931), it is determined whether or not the captured image generated by the image capturing unit 203 corresponds to an outdoor scene (step S932). In a case where it is not determined that the image corresponds to an outdoor scene (step S932), a normal automatic setting F is set (step S938), and the operation of the automatic image capturing condition setting process ends. In this case, the normal automatic setting F is set as the automatic image capturing condition.

On the other hand, in a case where it is determined that the image corresponds to an outdoor scene (step S932), a motion vector in the captured image generated by the image capturing unit 203 is calculated (step S939). Subsequently, it is determined whether or not the main subject is moving on the basis of the calculated motion vector (step S940). In a case where it is determined that the main subject is moving (step S940), the speed of the main subject is calculated on the basis of the calculated motion vector (step S941), and a moving-object optimum setting C is set (step S942). The process proceeds to step S943. The moving-object optimum setting C can contain a setting in which, for example, in accordance with an increase in the speed of the main subject, the shutter speed is increased to prevent subject blurring. Note that although it is supposed that the increase in the shutter speed will cause insufficient brightness, the insufficient brightness can be compensated for by opening the aperture or increasing the ISO sensitivity. In this regard, in a case where the aperture or the ISO sensitivity has reached the upper control limit, there is a possibility that the shutter speed cannot be increased. In such a case, for example, there is also available a method for capturing even a slightly dark image. Here, the absence of subject blurring is not always desirable. Slight subject blurring can produce realistic movement, and a method of performing the operation of recording a captured image with a slow shutter speed can also be conceived.

In addition, in a case where it is not determined that the main subject is moving (step S940) or after the moving-object optimum setting C has been set (step S942), it is determined whether or not a face has been detected in the captured image (step S943). In a case where a face has been detected in the captured image (step S943), it is determined whether or not the detected face is the main subject (step S944). In a case where it is determined that the detected face is the main subject (step S944), it is determined whether or not the setting C has been set and the detected face is moving (step S945). Here, the case where the setting C has been set is a case where the main subject is moving (step S940 to S942). In addition, since the determination of step S945 is performed after it has been determined that the detected face is the main subject (step S944), in a case where the setting C has been set, the case where the detected face is moving is obtained.

In a case where it is determined that the setting C has not been set (step S945) or in a case where it is determined that the detected face is not moving (step S945), a face optimum setting D is set (step S946), and the operation of the automatic image capturing condition setting process ends. In this case, the face optimum setting D is set as the automatic image capturing condition. The face optimum setting D can contain a setting in which, for example, control such as adding a soft focus effect, performing skin color correction, or actively opening the aperture to reduce the depth of field to blur the background is performed.

On the other hand, in a case where the setting C has been set and the detected face is moving (step S945), a face optimum setting E is set (step S947), and the operation of the automatic image capturing condition setting process ends. In this case, the moving-object optimum setting C and the face optimum setting E are set as the automatic image capturing condition. Here, since the shutter speed has been set for the face by using the setting C so as not to cause subject blurring, the face optimum setting E can contain a setting in which, for example, the aperture is set within a range in which the shutter speed is not changed.

In a case where no faces have been detected in the captured image (step S943) or in a case where it is not determined that the detected face is the main subject (step S944), it is determined whether or not the setting C has been set (step S948). In a case where it is determined that the setting C has been set (step S948), the operation of the automatic image capturing condition setting process ends. In this case, the moving-object optimum setting C is set as the automatic image capturing condition. On the other hand, in a case where it is determined that the setting C has not been set (step S948), the normal automatic setting F is set (step S949), and the operation of the automatic image capturing condition setting process ends. In this case, the normal automatic setting F is set as the automatic image capturing condition.

Figure 14:
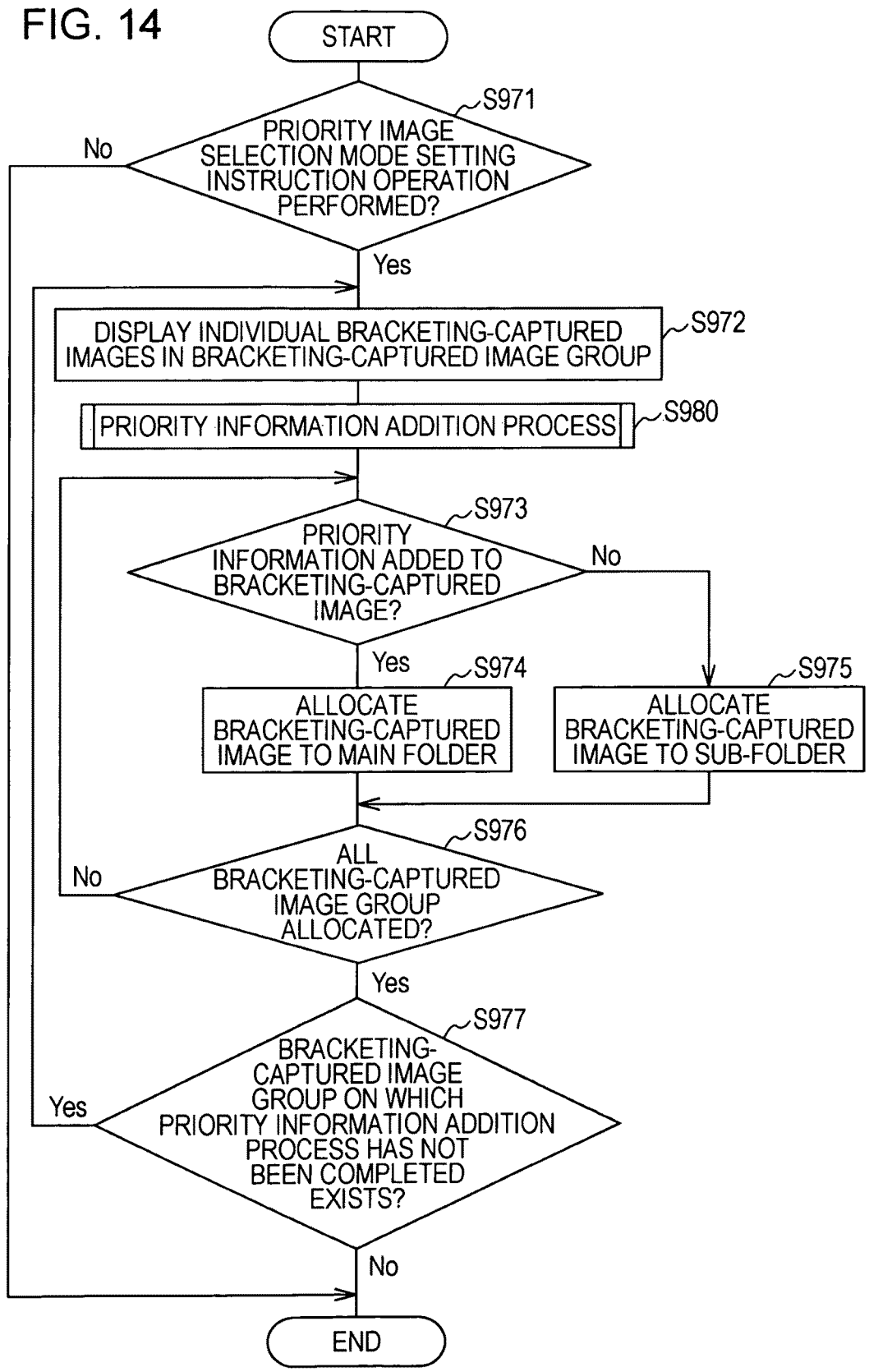
FIG. 14 is a flowchart illustrating a process procedure of a priority image selection process performed by the image capturing apparatus 100 in the embodiment of the present invention.

FIG. 14 is a flowchart illustrating a process procedure of a priority image selection process performed by the image capturing apparatus 100 in the embodiment of the present invention. In this example, a case where a bracketing-captured image that is not selected as a priority image is moved from a main folder to a sub-folder in a case where a plurality of bracketing-captured images included in the same bracketing-captured image group are allocated to the same main folder is illustrated by way of example.

First, it is determined whether or not a setting instruction operation for setting a priority image selection mode for selecting a priority image has been received by the operation receiving unit 201 (step S971). In a case where the setting instruction operation has not been received (step S971), the operation of the priority image selection process ends.

On the other hand, in a case where the setting instruction operation has been received (step S971), the display control unit 207 extracts individual bracketing-captured images included in one bracketing-captured image group from among a plurality of images recorded on the recording unit 206. Then, these individual bracketing-captured images are displayed on the display unit 208 (step S972). That is, a plurality of bracketing-captured images having the same group identifier added thereto and belonging to the same main folder are displayed on the display unit 208.

Subsequently, the priority image setting unit 209 performs a priority information addition process on each of the bracketing-captured images included in the one bracketing-captured image group (step S980). This priority information addition process will be explained in detail with reference to FIG. 15.

Subsequently, the priority image setting unit 209 determines whether or not priority information has been added to each of the plurality of bracketing-captured images on which the priority information addition process has been completed (step S973). Then, the priority image setting unit 209 allocates a bracketing-captured image with priority information added thereto to a main folder (step S974). That is, a bracketing-captured image with priority information added thereto will be allocated to the same main folder as the main folder (current main folder) to which it has belonged before the priority information addition process, and no moving between folders occurs. On the other hand, the priority image setting unit 209 allocates a bracketing-captured image with no priority information added thereto to a sub-folder having added thereto the same number (#) as that of the current main folder (step S975). Subsequently, the priority image setting unit 209 determines whether or not folder allocation has been completed for all the bracketing-captured images included in the bracketing-captured image group on which the priority information addition process has been completed (step S976). In a case where folder allocation has not been completed for all the bracketing-captured images (step S976), the process returns to step S973. On the other hand, in a case where folder allocation has been completed for all the bracketing-captured images (step S976), it is determined whether or not a bracketing-captured image group on which the priority information addition process has not been completed exists among the bracketing-captured image groups (step S977). Then, in a case where a bracketing-captured image group on which the priority information addition process has not been completed exists (step S977), the process returns to step S972. On the other hand, in a case where a bracketing-captured image group on which the priority information addition process has not been completed does not exist (step S972), the operation of the priority image selection process ends.

Note that while in this example, a case where the priority information addition process is performed on all the bracketing-captured image groups recorded on the recording unit 206 is illustrated by way of example, the priority information addition process may be performed only on a bracketing-captured image group specified by a user.

Figure 15:
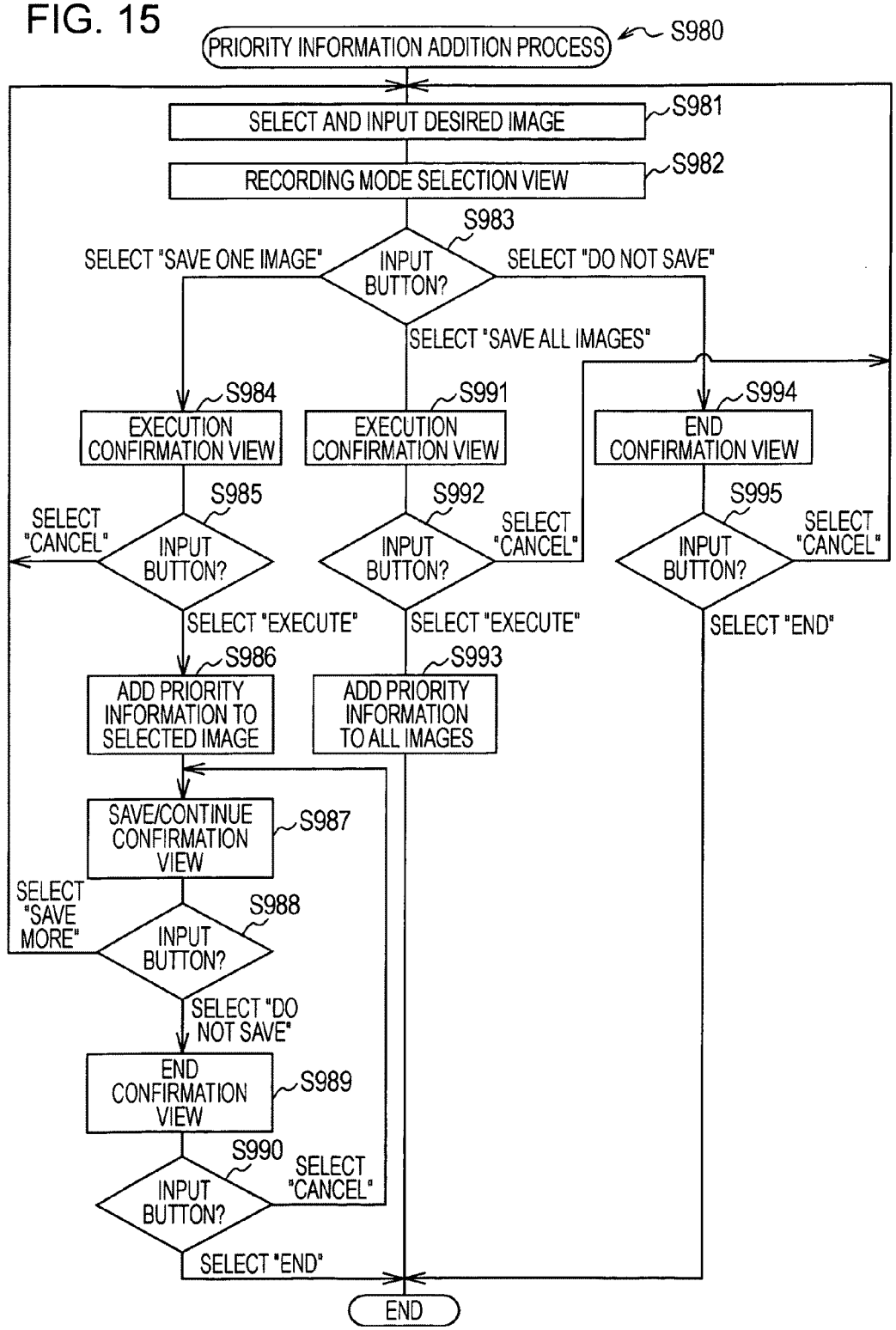
FIG. 15 is a flowchart illustrating a priority information addition process procedure in the process procedure of process procedure of the priority image selection process performed by the image capturing apparatus 100 in the embodiment of the present invention.

FIG. 15 is a flowchart illustrating a priority information addition process procedure (the process procedure of step S980 illustrated in FIG. 14) in the process procedure of the priority image selection process performed by the image capturing apparatus 100 in the embodiment of the present invention.

For example, as illustrated in FIGS. 6 to 8, a user performs a bracketing-captured image selection operation and selection deciding operation on a plurality of bracketing-captured images being displayed on the priority image selection screen (step S981). After the selection operation and the selection deciding operation have been performed, as illustrated in FIG. 9, the recording mode selection screen 710 is displayed (step S982).

Subsequently, it is determined which button of the recording mode selection view 720 being displayed on the recording mode selection screen 710 has been pressed (step S983). In a case where the "save one image" button 721 has been pressed on the recording mode selection view 720, the execution confirmation view 730 is displayed (step S984).

It is determined which button of the execution confirmation view 730 has been pressed in a case where the execution confirmation view 730 is being displayed (step S985). When the "cancel" button 732 is pressed on the execution confirmation view 730, the process returns to step S981. On the other hand, when the "execute" button 731 is pressed on the execution confirmation view 730, priority information is added to the bracketing-captured image on which the selection operation and the selection deciding operation have been performed in step S981 (step S986). Subsequently, the save/continue confirmation view 740 is displayed (step S987).

It is determined which button of the save/continue confirmation view 740 has been pressed in a case where the save/continue confirmation view 740 is being displayed (step S988). In a case where the "save more" button 741 has been pressed on the save/continue confirmation view 740 (step S988), the process returns to step S981 and the process of selecting a next priority image is performed. On the other hand, in a case where the "do not save" button 742 has been pressed on the save/continue confirmation view 740 (step S988), the end confirmation view 750 is displayed (step S989).

It is determined which button of the end confirmation view 750 has been pressed in a case where the end confirmation view 750 is being displayed (step S990). In a case where the "cancel" button 752 has been pressed on the end confirmation view 750 (step S990), the process returns to step S987. On the other hand, in a case where the "end" button 751 has been pressed on the end confirmation view 750 (step S990), the operation of the priority information addition process ends, and the process proceeds to step S973 illustrated in FIG. 14.

In a case where the "save all images" button 722 has been pressed on the recording mode selection view 720 (step S983), the execution confirmation view 730 is displayed (step S991). It is determined which button of the execution confirmation view 730 has been pressed in a case where the execution confirmation view 730 is being displayed (step S992). In a case where the "cancel" button 732 has been pressed on the execution confirmation view 730 (step S992), the process returns to step S981. On the other hand, in a case where the "execute" button 731 has been pressed on the execution confirmation view 730, priority information is added to all the bracketing-captured images being displayed on the recording mode selection screen 710 (step S993). Then, the operation of the priority information addition process ends, and the process proceeds to step S973 illustrated in FIG. 14.

In a case where the "do not save" button 723 has been pressed on the recording mode selection view 720 (step S983), the end confirmation view 750 is displayed (step S994). It is determined which button of the end confirmation view 750 has been pressed in a case where the end confirmation view 750 is being displayed (step S995). In a case where the "cancel" button 752 has been pressed on the end confirmation view 750 (step S995), the process returns to step S981. On the other hand, in a case where the "end" button 751 has been pressed on the end confirmation view 750 (step S995), the operation of the priority information addition process ends, and the process proceeds to step S973 illustrated in FIG. 14.

Figure 16:
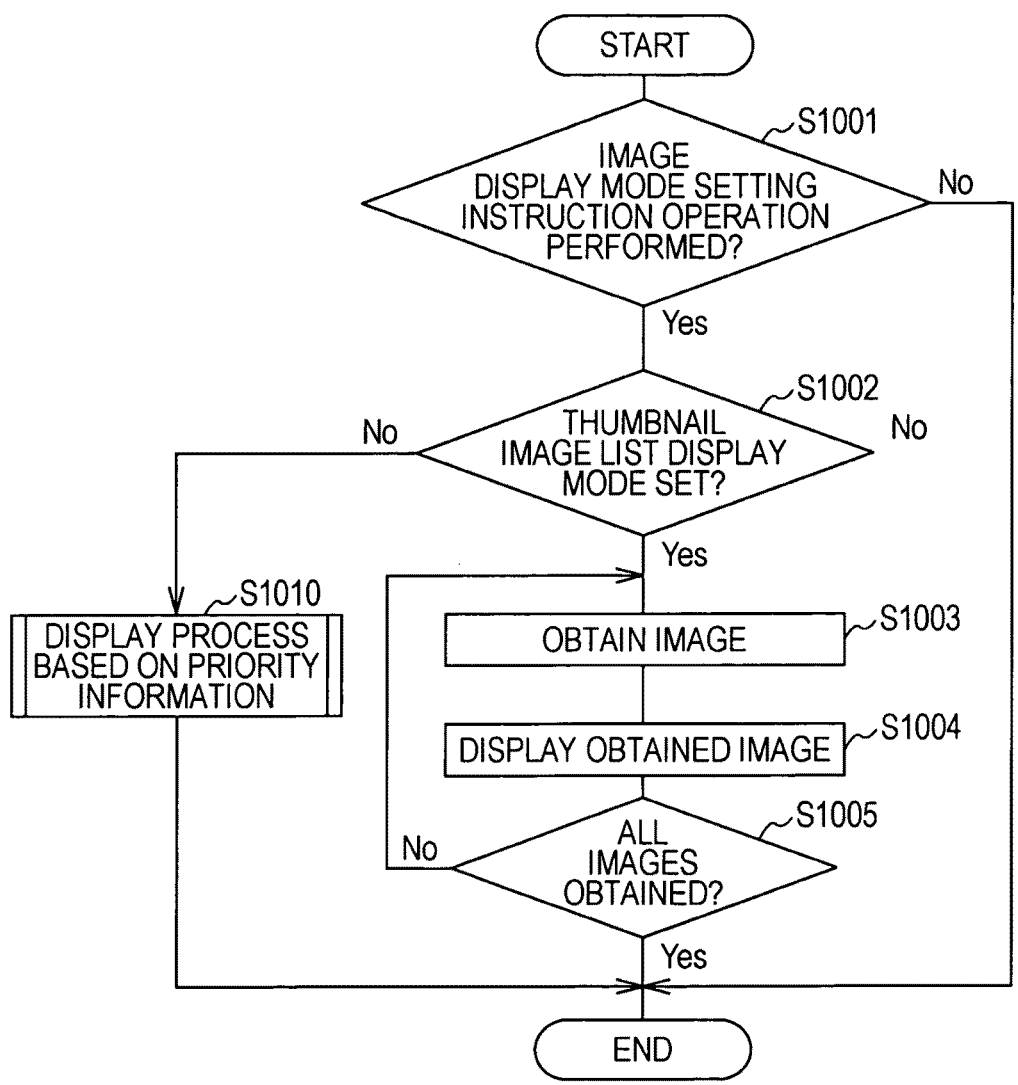
FIG. 16 is a flowchart illustrating a process procedure of an image display process performed by the image capturing apparatus 100 in the embodiment of the present invention.

FIG. 16 is a flowchart illustrating a process procedure of an image display process performed by the image capturing apparatus 100 in the embodiment of the present invention. This image display process is performed by the display control unit 207. In addition, in this example, an example where in a case where a thumbnail image list display mode is set, all bracketing-captured images are displayed and where in a case where an image display mode other than the thumbnail image list display mode is set, only a priority image among the bracketing-captured images is displayed will be explained. Note that it is assumed that images other than the bracketing-captured images are displayed regardless of which image display mode has been set. In addition, image display modes other than the thumbnail image list display mode include, for example, a preview display mode and a slideshow display mode.

First, it is determined whether or not an image display mode for displaying an image recorded on the recording unit 206 has been set (step S1001). In a case where no image display modes have been set (step S1001), the operation of the image display process ends. On the other hand, in a case where an image display mode has been set (step S1001), it is determined whether or not the set image display mode is the thumbnail image list display mode (step S1002).

In a case where the set image display mode is the thumbnail image list display mode (step S1002), an image recorded on the recording unit 206 is obtained (step S1003), and the obtained image is displayed as a thumbnail image on the display unit 208 (step S1004). Subsequently, it is determined whether or not all the images recorded on the recording unit 206 have been obtained (step S1005). In a case where all the images have not been obtained (step S1005), the process returns to step S1003. On the other hand, in a case where all the images recorded on the recording unit 206 have been obtained (step S1005), the operation of the image display process ends. Note that in a case where a large number of thumbnail images to be displayed on the display unit 208 exist, the thumbnail images are displayed in a list through scroll display or the like.

In addition, in a case where the set image display mode is not the thumbnail image list display mode (step S1002), an image display process based on priority information is performed (step S1010). Note that the image display process based on priority information will be explained in detail with reference to FIG. 17.

Figure 17:
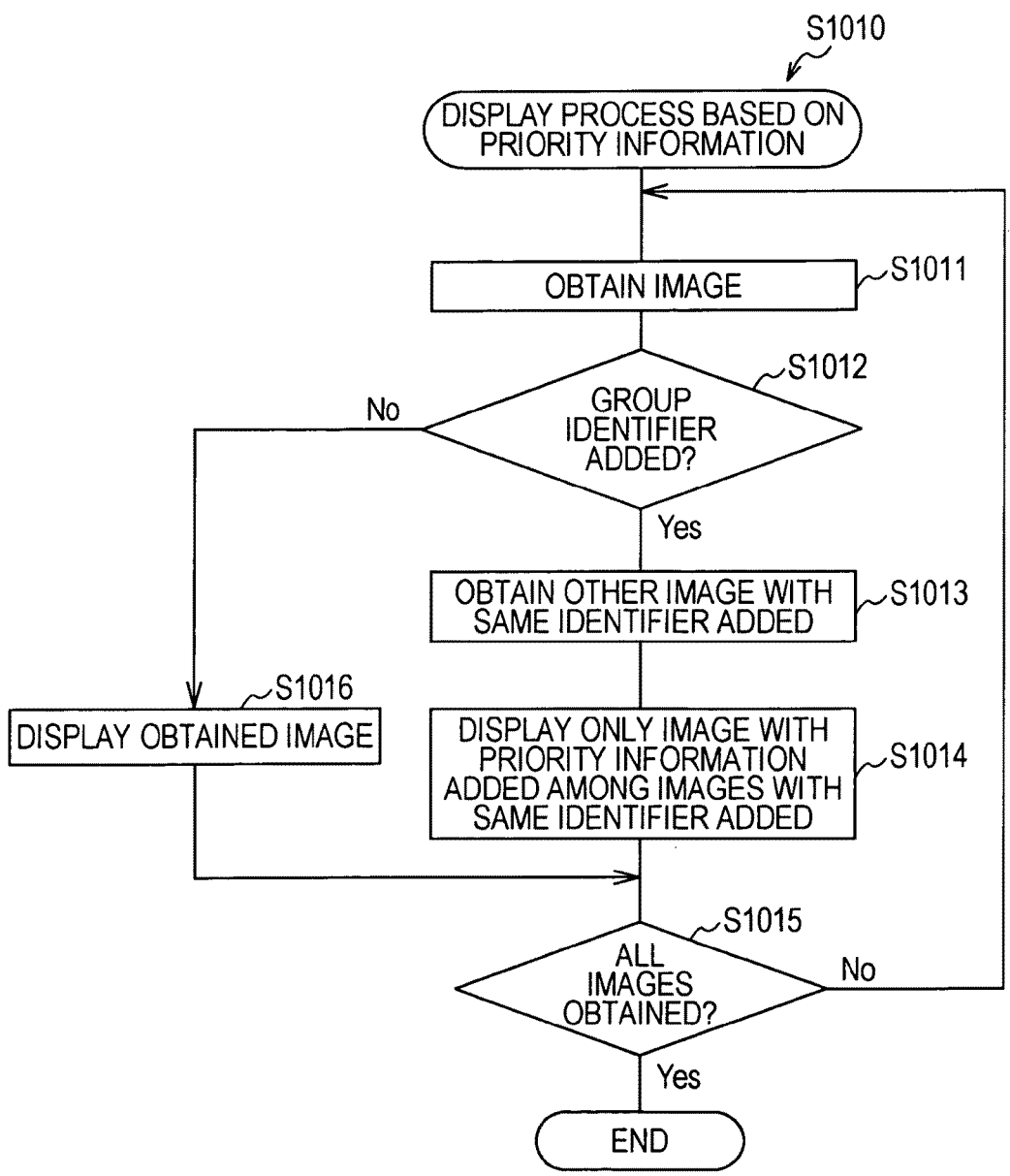
FIG. 17 is a flowchart illustrating an image display process procedure based on priority information in the process procedure of the image display process performed by the image capturing apparatus 100 in the embodiment of the present invention.

FIG. 17 is a flowchart illustrating an image display process procedure based on priority information (the process procedure of step S1010 illustrated in FIG. 16) in the process procedure of the image display process performed by the image capturing apparatus 100 in the embodiment of the present invention.

First, an image recorded on the recording unit 206 is obtained (step S1011), and it is determined whether or not the obtained image has a group identifier added thereto (step S1012). In a case where the obtained image has a group identifier added thereto (step S1012), another image having added thereto the same group identifier as the group identifier added to the obtained image is obtained from the recording unit 206 (step S1013). Subsequently, an image with priority information added thereto among a plurality of images with the same identifier added thereto is displayed on the display unit 208 (step S1014). Here, an image with no priority information added thereto among a plurality of images with the same identifier added thereto is not displayed on the display unit 208.

In addition, in a case where the obtained image has no group identifier added thereto (step S1012), the obtained image is displayed on the display unit 208 (step S1016).

Subsequently, it is determined whether or not all the images recorded on the recording unit 206 have been obtained (step S1015). In a case where all the images have not been obtained (step S1015), the process returns to step S1011. On the other hand, in a case where all the images recorded on the recording unit 206 have been obtained (step S1015), the operation of the image display process ends.

In the foregoing, in a case where the user-set bracketing capture condition has been set, a case where a bracketing capture process is performed using the user-set bracketing capture condition and the auto-bracketing capture condition has been explained by way of example. In addition, in a case where the user-set bracketing capture conditions have not been set, a case where a bracketing capture process is performed using the auto-bracketing capture condition has been explained by way of example. Here, for example, a bracketing capture process may be performed in accordance with whether or not the set bracketing capture condition is an image capturing condition regarding one image capturing condition object. Accordingly, in the following, a case where the bracketing capture mode is changed in accordance with whether the set bracketing capture condition is an image capturing condition regarding one image capturing condition object or an image capturing condition regarding a plurality of image capturing condition objects will be explained by way of example.

In this example, a case where a bracketing capture process is performed by setting a single bracketing capture mode or a multi-bracketing capture mode as a bracketing capture mode will be explained. The single bracketing capture mode is a bracketing capture mode that causes the image capturing unit 203 to generate, after setting image capture parameters with regard to the same image capturing condition object to different values, one image for each of the set image capture parameters. The single bracketing capture mode is, for example, an image capture mode that is performed in a case where a user has set a plurality of parameters with regard to one image capturing condition object (for example, the exposure value).

The multi-bracketing capture mode is a bracketing capture mode that causes the image capturing unit 203 to generate, after setting a plurality of image capturing conditions so that at least one of respective image capture parameters with regard to image capturing condition objects that are different from each other has values that are different from each other, one image for each of these image capturing conditions. The multi-bracketing capture mode is, for example, an image capture mode that is performed in a case where at least one of respective parameters with regard to a plurality of image capturing condition objects (for example, the exposure value, the aperture value, and the ISO sensitivity) is set by the automatic image capturing condition setting unit 204 so as to have values that are different from each other. In addition, the multi-bracketing capture mode can also be set in a case where both the individual parameters set by the automatic image capturing condition setting unit 204 and the individual parameters set by the user are used for a plurality of image capturing condition objects. Note that the single bracketing capture mode or the multi-bracketing capture mode is set by the operation mode control unit 202.

For example, in a case where bracketing capture is performed in the single bracketing capture mode in which a plurality of parameters have been set by a user for the exposure value (image capturing condition object), the bracketing capture is performed using only the image capturing condition set by the user. Therefore, it is predicted that the display of a large number of bracketing-captured images against the user's intention will less occur. Accordingly, in the following, an example where in a case where bracketing capture is performed in the single bracketing capture mode, no group identifier is added to a captured image will be explained.

In addition, in a case where the single bracketing capture mode has been set, the recording control unit 205 records individual captured images generated using the bracketing capture process on the recording unit 206 without adding group identifiers to these respective captured images.

Figure 18:
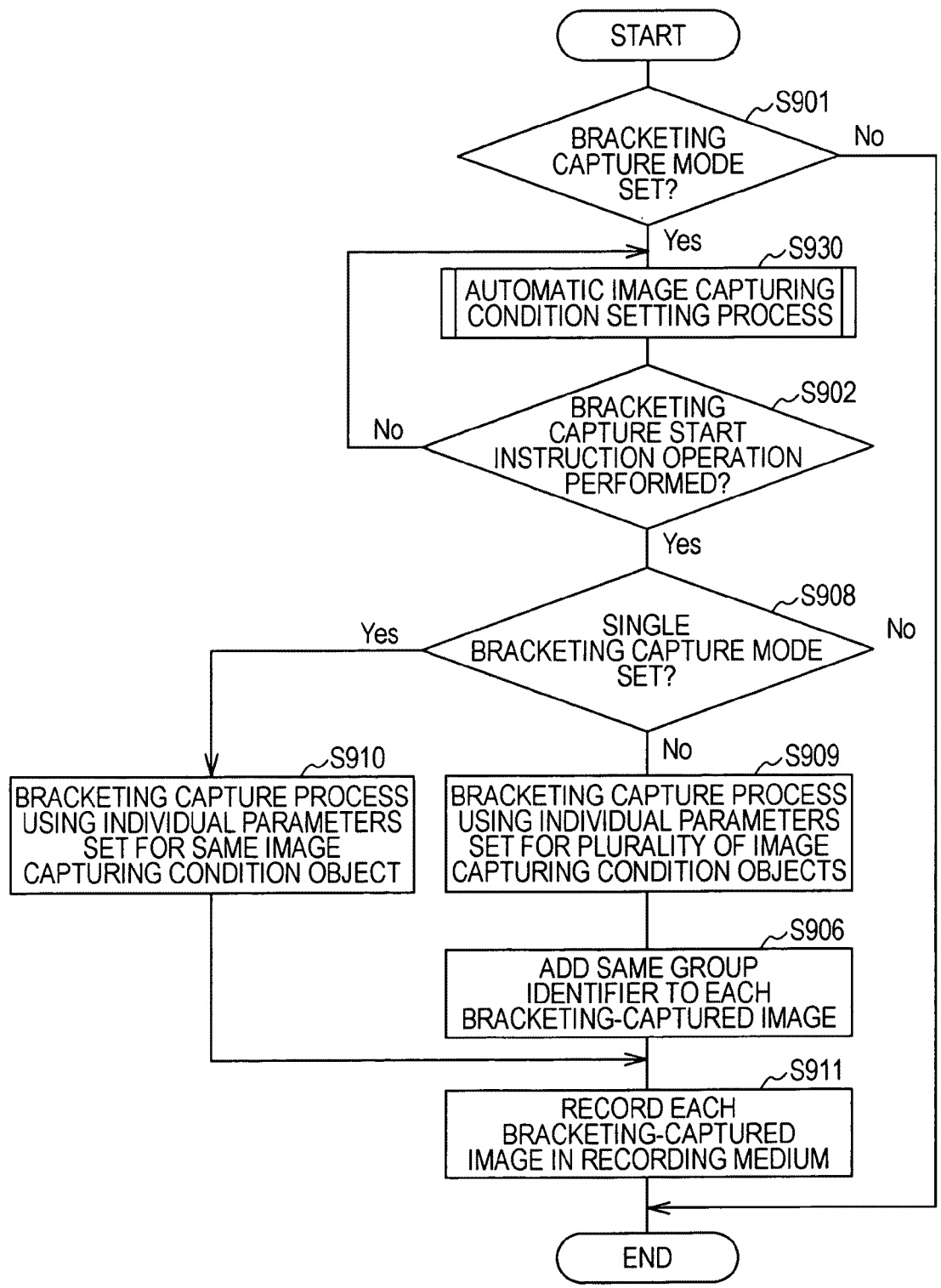
FIG. 18 is a flowchart illustrating a process procedure of a bracketing-captured image recording process performed by the image capturing apparatus 100 in the embodiment of the present invention.

FIG. 18 is a flowchart illustrating of a process procedure of a bracketing-captured image recording process performed by the image capturing apparatus 100 in the embodiment of the present invention. This process procedure is an example modification of the process procedure illustrated in FIG. 11. The process procedures other than steps S908 to S911 illustrated in FIG. 18 are the same as the process procedures illustrated in FIG. 11, and will not be explained herein.

In a case where a start instruction operation for starting bracketing capture has been received by the operation receiving unit 201 (step S902), it is determined whether or not the single bracketing capture mode has been set (step S908). In a case where the single bracketing capture mode has been set (step S908), the image capturing unit 203 performs a bracketing capture process using individual parameters that are set for the same image capturing condition object (step S910). Subsequently, the recording control unit 205 records individual captured images to which the same group identifier is not added on the recording unit 206 (step S911). The captured images recorded in the above manner have no group identifiers added thereto, and are not targeted for setting a priority image by using the priority image setting unit 209.

On the other hand, in a case where the multi-bracketing capture mode has been set (step S908), the image capturing unit 203 performs a bracketing capture process using individual parameters that are set for a plurality of image capturing condition objects (step S909). Subsequently, the recording control unit 205 adds the same group identifier to the plurality of captured images generated by the image capturing unit 203 (step S906), and records the individual captured images with the same group identifier added thereto on the recording unit 206 (step S911). The captured images recorded in the above manner have group identifiers added thereto, and are targeted for setting a priority image by using the priority image setting unit 209.

In addition, in FIG. 2, an example where operation members such as the up/down/left/right operation button 511 and the set button 512 are provided on an outer side surface of the image capturing apparatus 100 is illustrated. However, for example, the image capturing apparatus 100 may be provided with a touch panel, and each operation may be performed using this touch panel. In the following, an example of an image capturing apparatus provided with a touch panel is illustrated.

FIG. 19 is a diagram illustrating an example external configuration of an image capturing apparatus 800 in an embodiment of the present invention. The image capturing apparatus 800 includes a zoom lens 801, a focus lens 802, an aperture 803, an imager 804, a flash device 805, a liquid crystal display unit 806, a power switch 807, and a release switch 808. Here, the image capturing apparatus 800 is configured such that a portion of the image capturing apparatus 100 illustrated in FIG. 2 is modified. That is, the image capturing apparatus 800 is a digital still camera in which the operation of selecting an image, a button, or the like to be displayed on the liquid crystal display unit 806 is performed using a touch panel disposed on the liquid crystal display unit 806 instead of using the operation members such as the up/down/left/right operation button 511 in the image capturing apparatus 100.

For example, a user directly touches a button displayed on the liquid crystal display unit 806, such as a "ZOOM" button 809 or a "MODE" button 810, thereby implementing the function corresponding to the button. In addition, at the time of selecting an image, a user directly touches an image, thereby selecting the image. With the use of the touch panel in this manner, a user can perform an intuitive operation input, and the number of input steps for selection can further be significantly reduced. Note that the configuration other than the liquid crystal display unit 806 is substantially similar to that of the image capturing apparatus 100 illustrated in FIG. 2, and will not be explained herein.

In this manner, according to an embodiment of the present invention, bracketing-captured images are displayed, and a user-preferred bracketing-captured image can be easily selected as a priority image from among these bracketing-captured images. In addition, all the captured images generated by bracketing capture are recorded, and a priority image can be displayed and selected after the bracketing-capture operation. This can reduce failure caused by recording a captured image.

In addition, for example, in a display mode other than the thumbnail image display mode, bracketing-captured images other than a priority image are not displayed. Thus, even in a case where a large number of bracketing-captured images have been recorded, the time for retrieval, search, or the like can be reduced. For example, in a slideshow or the like, any inconvenience such as consecutive appearances of similar images can be avoided. Note that, for example, since bracketing-captured images other than a priority image are also displayed in the thumbnail image display mode, all the images recorded on the image capturing apparatus 100 can be easily checked.

In addition, the bracketing capture condition is set by combining the user-set bracketing capture condition and the auto-bracketing capture condition, whereby the possibility that a user-preferred image can be selected can be increased. This allows further reduction in failure caused by recording a captured image.

In addition, with the utilization of a bracketing-captured image as a material for learning user preference, the automatic image capturing condition set by the image capturing apparatus 100 can be further optimized for a user. That is, automatic image capturing conditions that take user preference into consideration can be easily set.

Furthermore, a case where in a case where bracketing capture is performed in the single bracketing capture mode, a priority image is not to be set while in a case where bracketing capture is performed in the multi-bracketing capture mode, a priority image is to be set. Therefore, all bracketing-captured images that meet the user's intention can be displayed. In addition, a large number of bracketing-captured images can be prevented from being displayed against the user's intension.

That is to say, according to an embodiment of the present invention, there is an outstanding advantage that in bracketing capture in which a plurality of successive images are captured with an image capturing condition changed such as the exposure value, a user can easily and appropriately select a preferred image from among a plurality of captured images. In addition, there is another outstanding advantage that a user-preferred image can be easily displayed for a plurality of images generated by bracketing capture.

Note that while in an embodiment of the present invention, a case where one of the user-set bracketing capture condition and the automatic image capturing condition, or a combination thereof is set as a bracketing capture condition has been illustrated by way of example, these settings may be performed in accordance with a user operation. In addition, priorities may be set for individual image capturing conditions of a bracketing capture condition, and a bracketing-captured image with a high-priority image capturing condition may be preferentially displayed when a priority image is selected.

In addition, in an embodiment of the present invention, an example where a priority image is allocated to a main folder and where a bracketing-captured image that is not selected as a priority image is allocated to a sub-folder has been explained. However, all the bracketing-captured images may be allocated to the same folder and may be recorded even after the operation of selecting a priority image has been completed. In this manner, in a case where displaying is performed in such a state that all bracketing-captured images are allocated to the same folder, the displaying is performed by referring to priority information. Control can be performed so that, for example, on the occasion of preview display, slideshow display, or the like, only a priority image with priority information added thereto is displayed.

In addition, in an embodiment of the present invention, an example where in a case where the operation of selecting a priority image is performed by a user, priority information is added to a selected priority image has been explained. However, a priority image and a bracketing-captured image that is not selected as a priority image may be distinguished from each other using, for example, a folder. For example, instead of adding priority information to a selected priority image, the priority image is allocated to a main folder and a bracketing-captured image that is not selected as a priority image is allocated to a sub-folder. Then, in a case where the displaying of the priority image is performed, the displaying is performed by referring to the folders. Control can be performed so that, for example, on the occasion of preview display, slideshow display, or the like, only a bracketing-captured image (priority image) allocated to a main folder is displayed.

In addition, in an embodiment of the present invention, an example where all bracketing-captured images are recorded even after the operation of selecting a priority image has been completed has been explained. However, for example, in a case where the capacity of the storage area of the recording unit 206 becomes small, bracketing-captured images recorded so as to be allocated to sub-folders may be sequentially deleted. In this case, for example, the bracketing-captured images can be deleted in order of recording time. In addition, preferably, the recording unit 206, which is capable of recording bracketing-captured images for a long period of time, is used. However, a buffer or the like capable of temporarily recording bracketing-captured images may be used as the recording unit 206 and a bracketing-captured image may be transferred from the recording unit 206 to a different memory at a predetermined time.

In addition, while in an embodiment of the present invention, the time at which the user preference determination unit 210 analyzes user preference is not particularly specified, for example, preference analysis may be made in the background of the image capture process performed by the image capturing apparatus 100. In this case, by recording all the bracketing-captured images that are not selected, a sufficient amount of time for analyzing user preference can be obtained and statistic processing can be implemented. Therefore, preference analysis can effectively be implemented. In addition, content learned in the above processes can be inherited by replacing substrates at the time of replacement by purchase or at the time of failure, or the like, or preference analysis may be made again using images transferred from outside.

In addition, while in an embodiment of the present invention, a case where the selection of a priority image by a user is performed after the user has performed the setting instruction operation for the priority image selection mode has been explained by way of example, the selection may be performed immediately after the bracketing-capture operation or after a certain period of time has elapsed. In this case, for example, the displaying of a list of bracketing-captured images can be automatically performed immediately after the bracketing-capture operation or after a certain period of time has elapsed. In addition, the period for which a user selects a priority image may be set by the user. In addition, in a case where a display mode has been set, the selection of a priority image by a user may be sequentially performed during reproduction in this display mode.

In addition, while in an embodiment of the present invention, an image capturing apparatus capable of displaying a bracketing-captured image has been explained by way of example, an embodiment of the present invention can be applied to a display control apparatus capable of displaying an image, such as a personal computer. In addition, while in an embodiment of the present invention, an example where the priority image selection operation or the like is performed using an operation member provided in an image capturing apparatus has been explained, for example, an operation input from an external device may be received via wireless communication, and a priority image selection process or the like may be performed in accordance with this operation input. In addition, while in an embodiment of the present invention, an example where an image is displayed on a display unit of an image capturing apparatus, for example, an embodiment of the present invention can be applied to a case where display information for displaying an image is output to an external device and where an image is displayed on this external device.

Note that an embodiment of the present invention is intended to illustrate an example for embodying the present invention, and has individual correspondences with the subject matter of the invention defined in claims, as described above. In this regard, the present invention is not to be limited to an embodiment, and a variety of modifications can be made without departing from the scope of the present invention.

In addition, the process procedures explained in an embodiment of the present invention may be handled as a method having these series of procedures and as a program for causing a computer to execute these series of procedures or a recording medium storing the program. This recording medium can be implemented using, for example, a CD (Compact Disc), an MD (MiniDisc), a DVD (Digital Versatile Disk), a memory card, a Blu-ray Disc (registered trademark), or the like.

The invention claimed is:

1. A display control apparatus comprising:
a user preference determination unit that generates user preference information that identifies a user's favorite image capturing conditions;
a priority image setting unit that sets at least one image, as a priority image, on the basis of a user selection, among a bracketed image group composed of a plurality of images generated by a single bracketing-capture operation; and
a display control unit that controls a display state of a display unit so that only the priority image among the bracketed image group is displayed on the display unit in a predetermined mode,
wherein when the user has set a user-set bracketing condition the at least one image is selected for setting based on the user-set bracketing condition and the preference information, and when the user has not set a user-set bracketing condition the at least one image is selected for setting based only on the preference information.

2. The display control apparatus according to claim 1, wherein the priority image setting unit adds priority information to the priority image, and wherein the display control unit controls the display state on the basis of the priority information.

3. The display control apparatus according to claim 1, further comprising a group identifier adding unit that adds a same group identifier to each of the images included in the bracketed image group generated by a same bracketing-capture operation.

4. The display control apparatus according to claim 3, wherein the priority image setting unit allocates, for the bracketed image group, the priority image to a first folder and further allocates an image other than the priority image to a second folder different from the first folder.

5. The display control apparatus according to claim 1, further comprising a folder allocating unit that allocates each of the images included in the bracketed image group generated by a same bracketing-capture operation to a same folder.

6. The display control apparatus according to claim 1, further comprising an operation receiving unit that receives a specifying operation for specifying at least one display mode among a plurality of display modes including the predetermined mode, wherein the display control unit controls the display state of the display unit so that in a case where a specifying operation for specifying the predetermined mode has been received, only the priority image among the bracketed image group is displayed on the display unit, and controls the display state of the display unit so that in a case where a specifying operation for specifying a display mode other than the predetermined mode has been received, each of the images included in the bracketed image group is displayed on the display unit.

7. An image capturing apparatus comprising:
a user preference determination unit that generates user preference information that identifies a user's favorite image capturing conditions;
an image generation unit that generates an image by performing a bracketing-capture operation; and
a priority image setting unit that sets at least one image, as a priority image, on the basis of a user selection, among a bracketed image group composed of a plurality of images generated by a single bracketing-capture operation,
wherein when the user has set a user-set bracketing condition the at least one image is selected for setting based on the user-set bracketing condition and the preference information, and when the user has not set a user-set bracketing condition the at least one image is selected for setting based only on the preference information.

8. The image capturing apparatus according to claim 7, further comprising an operation mode control unit that causes the image generation unit to operate in a first bracketing capture mode that causes the image generation unit to generate, as the bracketing-capture operation, after setting image capture parameters with regard to a same image capturing condition object to different values, one image for each of the set image capture parameters, and in a second bracketing capture mode that causes the image generation unit to generate, as the bracketing-capture operation, after setting a plurality of image capturing conditions so that at least one of respective image capture parameters with regard to image capturing condition objects that are different from each other has values that are different from each other, one image for each of the set image capturing conditions,
wherein the priority image setting unit sets only the bracketed image group generated in the second bracketing capture mode to be subjected to setting of the priority image.

9. A display control method comprising:
a user preference determining procedure that generates user preference information that identifies a user's favorite image capturing conditions;
a priority image setting procedure of setting at least one image, as a priority image, on the basis of a user selection, among a bracketed image group composed of a plurality of images generated by a single bracketing-capture operation; and
a display control procedure of controlling a display state of the display unit so that only the priority image among the bracketed image group is displayed on the display unit in a predetermined mode,
wherein when the user has set a user-set bracketing condition the at least one image is selected for setting based on the user-set bracketing condition and the preference information, and when the user has not set a user-set bracketing condition the at least one image is selected for setting based only on the preference information.

* * * * *